(12) United States Patent
Reed

(10) Patent No.: US 6,327,741 B1
(45) Date of Patent: Dec. 11, 2001

(54) CONTROLLED SELF OPERATED VACUUM CLEANING SYSTEM

(75) Inventor: Norman F. Reed, Carpinteria, CA (US)

(73) Assignee: Robert J. Schaap, Encino, CA (US); a part interest (*) Notice: Subject to any disclaimer, the term of this patent is extended or adjusted under 35 U.S.C. 154(b) by 0 days.

(21) Appl. No.: 09/541,189

(22) Filed: Apr. 3, 2000

Related U.S. Application Data

(62) Division of application No. 08/788,424, filed on Jan. 27, 1997, now Pat. No. 6,076,226.

(51) Int. Cl.[7] ............................................. A47L 9/28
(52) U.S. Cl. ............................................. 15/319; 15/340.1
(58) Field of Search ....................................... 15/319, 340.1

(56) References Cited

U.S. PATENT DOCUMENTS

| | | | |
|---|---|---|---|
| 5,444,893 | * | 8/1995 | Hwang et al. ........................ 15/319 |
| 5,634,237 | * | 6/1997 | Paranjpe ............................... 15/319 |
| 5,787,545 | * | 8/1998 | Colens ................................. 15/319 |
| 5,815,880 | * | 10/1998 | Nakanishi ............................. 15/319 |
| 5,940,927 | * | 8/1999 | Haegermarck et al. ................ 15/319 |
| 6,119,057 | * | 9/2000 | Kawagoe ........................... 15/319 X |

\* cited by examiner

Primary Examiner—Chris K. Moore
(74) Attorney, Agent, or Firm—Robert J. Schaap

(57) ABSTRACT

A controlled self operating vacuum cleaning system which comprises a stationary housing for the storage of a mobile vacuum cleaner apparatus and where the housing is provided with an automatically openable and closable closure allowing exit and entry of the mobile vacuum cleaner unit. The mobile unit is driven by an internal drive motor which is powered by one or more batteries carried by the mobile vacuum cleaner unit. At preestablished times and preestablished time intervals, the closure of the housing will automatically open providing for ingress and egress and the mobile vacuum cleaner unit will exit and randomly clean the carpet of a certain specified area for a predetermined time period. The mobile vacuum cleaner unit is provided with obstacle detectors for causing the mobile unit to move beyond an obstacle, if it contacts an obstacle, as well as detectors for detecting the edge of a staircase and the edge of a carpet to cause the mobile unit to remain on the carpeted area. Upon return to the housing after the predetermined time interval, the mobile vacuum cleaner unit is automatically connected to a recharging electrical circuit for recharging the batteries of the mobile vacuum cleaner unit and simultaneously an additional vacuum dirt collection system causes evacuation of the dirt collected by the mobile cleaner unit.

15 Claims, 15 Drawing Sheets

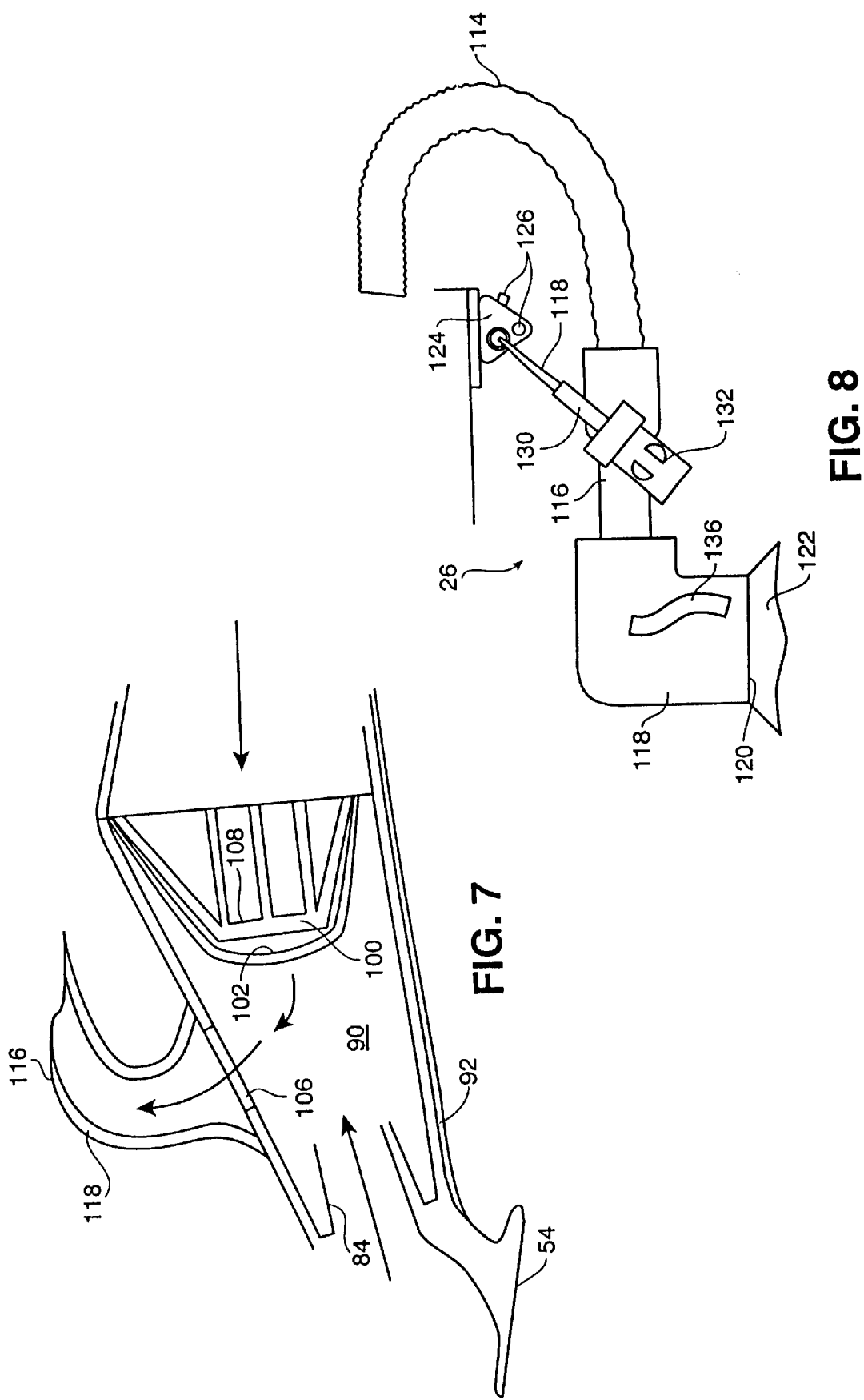

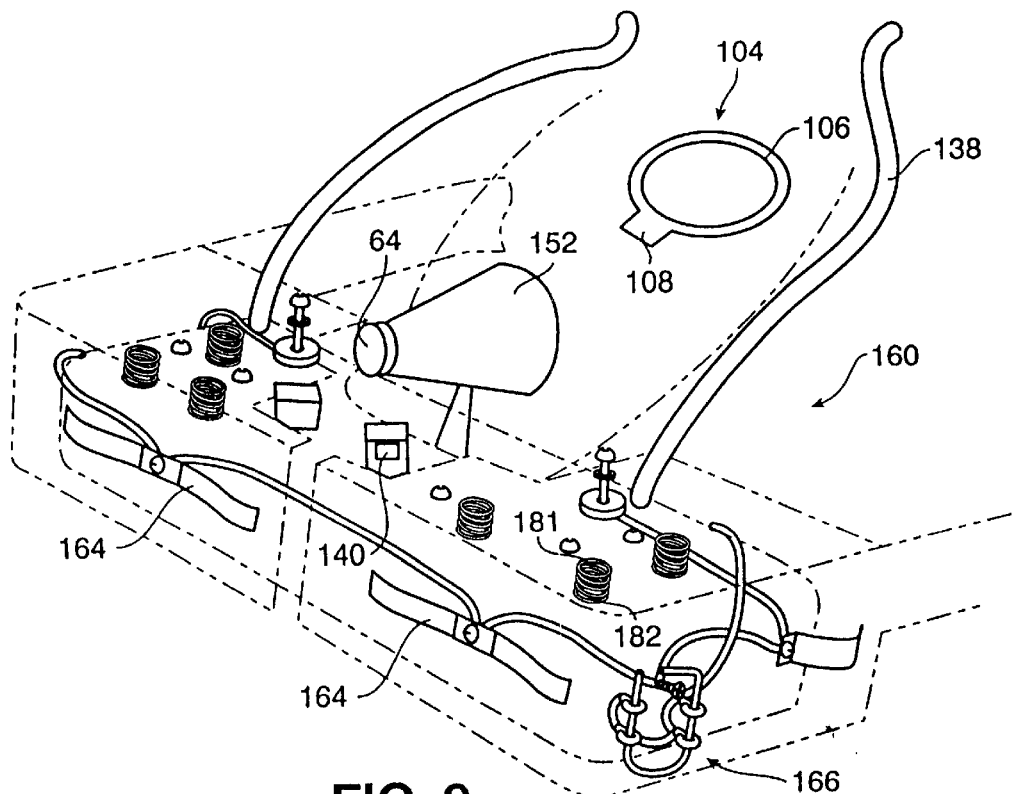
FIG. 9
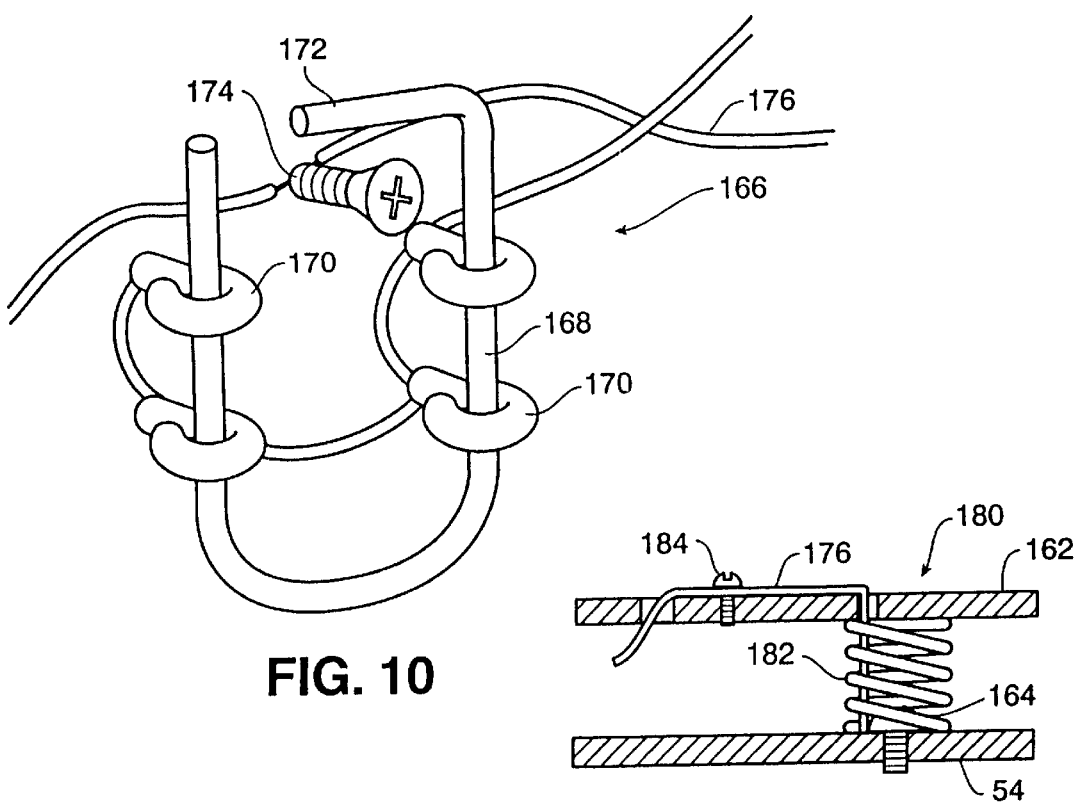
FIG. 10
FIG. 11

CONTROLLED SELF OPERATED VACUUM CLEANING SYSTEM

RELATED APPLICATION

This application is a division of my U.S. patent application Ser. No. 08/788,424, filed Jan. 27, 1997, now U.S. Pat. No. 6,076,226, issued Jun. 20, 2000 for Controlled Self-Operated Vacuum Cleaning System.

BACKGROUND OF THE INVENTION

1. Field of the Invention

This invention relates in general to certain new and useful improvements in vacuum cleaner systems and more particularly, to a vacuum cleaning system which is automatically operable at preselected times and for preselected time intervals requiring little or no manual intervention.

2. Brief Description of the Related Art

Although electrically operated carpet and rug cleaning vacuum cleaners have been commercially available for more than fifty years, very few significant advances have been made in the art of these vacuum cleaners. The advances made since the inception of the original vacuum cleaner are generally involved in superior motors, better brushes and to a large degree, enhanced aesthetics. However, in essentially all cases, commercially available rug and carpet vacuum cleaners still require a substantial amount of manual attention in both operation and periodic maintenance.

In essentially all cases, one must manually remove the vacuum cleaner from a storage location, such as a garage or a closet, plug the vacuum cleaner into a source of electrical power and physically move the vacuum cleaner across a selected carpet area. When the user has finished cleaning a selected area, the user must then disconnect and wind up the electrical cord and carry the vacuum cleaner to the same storage location. Frequently, the user must remove the debris collection bag and empty the same and then reinstall the bag into the vacuum cleaner. Thus, a great deal of manual intervention is necessarily required in the cleaning of a carpet or a rug.

There has been one proposal for a somewhat automatically operable vacuum cleaner set forth in U.S. Pat. No. 5,341,540 dated Aug. 30, 1994 to Soupert, et al. The apparatus in the Soupert, et al. patent, which is described as an autonomous apparatus for the automatic cleaning of ground areas is essentially a preprogrammed, controlled vacuum cleaner operating much in the same manner as a numeric controlled tool or a computer controlled tool. In Soupert, et al., the vacuum cleaner is pre-programmed with a series of instructions stored in a computer memory in the apparatus. The apparatus is then caused to move in a prescribed path and only in that prescribed path relative to a fixed reference beam. In fact, the apparatus can only operate in response to location control from that fixed reference beam.

Although the device in the Soupert, et al. patent does have means for moving on its own stored source of power, it does not have means to exit a housing at a prescribed time and randomly cover an entire carpeted area and does not have other features as for example, recharging, automatically cleaning of the debris from the vacuum cleaner and the like.

There have also been developed in the prior art various types of bumper obstacle detection sensors. One such bumper obstacle detection sensor is described in U.S. Pat. No. 4,968,878 dated Nov. 6, 1990 to Pong et al. This obstacle detector system in the Pong et al. apparatus relies upon transceiver directed light beams and reflectors for detecting the presence of an obstacle. U.S. Pat. No. 5,208,521 dated May 4, 1993 to Aoyama discloses a control system for a self moving vehicle which is actually in the nature of a vacuum cleaner for the cleaning of carpeted areas. However, the Aoyama patent is primarily concerned with the control system itself for purposes of correcting yaw, speed of the device, etc. A complex feedback and error signal control means is used to achieve this precise control. To this extent, Aoyama does disclose a self moving vacuum cleaner, although the vacuum cleaner must move in response to pre-programmed control signals for control of direction and the like, but beyond this is not automatically operable, as such.

There have also been many robotic-type apparatus used for performing a variety of tasks. One such robotic apparatus is described as a robotic decontamination apparatus in U.S. Pat. No. 5,147,002 dated Sep. 15, 1992 to Hughes. This apparatus is specifically designed to decontaminate an area which would be hazardous to the presence of a human being and thus, must be robotically controlled. However, there has not been any effective robotically controlled vacuum cleaner, or for that matter any vacuum cleaner having automatic features, except for those described herein.

There has been a need for an effective robotic-type cleaning apparatus which can actually operate on its own, without manual intervention, and which will not damage or destroy other furniture or items which may be in the path of the robotic-type cleaning apparatus. Further, there has been a need for an apparatus of this type which would not allow for inadvertent destruction of itself, as for example, by means of falling off of steps, drop-offs, or the like. Such an apparatus would find highly effective use for those parties desiring to clean a selected area while the party may not even be present in that selected area.

A robotic-type cleaning apparatus which is essentially self operating without any substantial manual intervention could be used highly effectively in commercial institutions, such as hotels and the like. In addition, such an apparatus would find highly effective widespread home use in that home users who are occupied, for example, during the daylight hours with school, employment, or the like, could self-program the cleaning apparatus to operate in their absence and without a fear of attendant damage to furniture or other items within the environment.

OBJECTS OF THE INVENTION

It is, therefore, one of the primary objects of the present invention to provide a substantially fully automated vacuum cleaning system for the cleaning of rugs and carpets and which requires only periodic manual intervention on a limited basis.

It is another object of the present invention to provide a substantially fully automated carpet cleaning system of the type stated which include a bumper operated sensory control system for detecting and avoiding obstacles in a carpet cleaning operation.

It is a further object of the present invention to provide a substantially fully automated vacuum cleaning system of the type stated which allows for random movement across a selected area and which thereby effectively covers the entire area and does not require pre-programming for direction, speed and the like.

It is an additional object of the present invention to provide a substantially fully automated vacuum cleaning system of the type stated--which allows a self controlled and self moving vacuum cleaning apparatus to exit a housing, clean a selected area for a predetermined time interval and at predetermined times and automatically return to the housing without any manual intervention.

It is another salient object to provide an automatic vacuum cleaning system of the type stated which includes auxiliary features for automatic recharging of stored energy power systems and automatic removal of debris collected by the self moving vacuum cleaning apparatus.

It is still another object of the present invention to provide a substantially fully automated carpet vacuum cleaning system which can be constructed at a relatively low cost and is highly reliable and effective in operation.

It is yet another object of the present invention to provide a method for conducting carpet cleaning operations on an automated basis with little or no manual intervention except for a periodic maintenance and debris removal.

With the above and other objects in view, my invention resides in the novel features of form, construction, arrangement and combination of parts and components presently described and pointed out in the claims.

BRIEF SUMMARY OF THE INVENTION

The present invention relates in general terms to a substantially fully automated carpet cleaning system which is effectively pre-programmed to operate at a selected time and for a selected time interval without any manual intervention whatsoever. The carpet cleaning system comprises a self powered and self moving carpet cleaning apparatus, commonly referred to as a "vehicle" or "mobile unit" which will move randomly across an entire carpeted area and clean the same during this pre-programmed and predetermined time interval.

The carpet cleaning system of the present invention is primarily designed for the cleaning of carpets although the term "carpet" is used in a broad sense to include rugs and other fabric material floor coverings. Moreover, it should be understood that the system of the present invention is easily adaptable to the cleaning of other floor areas, such as non-carpeted work areas and the like.

The vacuum cleaning system of the present invention includes a stationary housing for the storage of a self moving and self controlled vacuum cleaning apparatus, sometimes referred to as a vehicle, as aforesaid, or as a mobile vacuum cleaner unit. The housing is provided with an openable and a closable door which will automatically open at the preselected time interval and allow the vacuum cleaner vehicle to perform a cleaning operation. Upon return of the vacuum cleaner vehicle to the housing, the door will then close, in a manner to be hereinafter described in more detail.

The mobile vacuum cleaner unit is comprised of an outer casing which contains one or more drive motors for driving rotatable drive wheels and a stored source of electrical power, such as one or more batteries. The batteries are sufficient to drive the self powered vehicle through the predetermined carpet cleaning time cycle and are capable of being recharged, in a manner to also be hereinafter described in more detail. The casing or body of the self moving vacuum cleaner unit is further provided with relays, a control circuit and the like for the complete operation of the vacuum cleaner vehicle.

The mobile vacuum cleaner unit is also provided with sensory means for detecting the presence of an obstacle. In a preferred embodiment, the sensory means are bumper controlled sensory means which cause the vehicle to alter its movement path when contacting a fixed obstacle. Thus, if the mobile vacuum cleaner unit should contact a piece of furniture, its driving movement will automatically stop. A control mechanism will cause an immediate change in driving direction, such as a reverse driving and then a change in direction, to cause the vacuum cleaner vehicle to leave the area of the obstruction.

It has been found in connection with the present invention that a random cleaning pattern is effective to cover an entire carpeted area, much in the same manner as pool cleaners randomly clean a surface of a swimming pool, in a specific time period. The mobile vacuum cleaner unit will generally traverse substantially all of the surface area of the carpet which requires cleaning except for those portions which are covered by obstacles.

The mobile vacuum cleaner unit of the present invention is also provided with other sensors to insure that the vehicle remains only on the carpeted area. Thus, for example, sensors on the vehicle will detect the edge of a carpet and thereby change the direction of movement of the vehicle to cause the vehicle to remain only on the carpeted area. Stairwell and depression detection means is also provided to preclude the vehicle from driving down a stairwell or otherwise a potentially damaging drop-off.

The mobile vacuum cleaning unit includes a storage area for the temporary storage of the debris, such as the dust and dirt which is collected during a vacuum cleaning operation. The housing also contains a debris collection station. Thus, when the mobile vacuum cleaner unit moves back into the housing and the door to the housing closes, the debris collection station automatically causes a suction tube to be connected to the temporary debris collection member in the vehicle and removes the debris from the vehicle so that it is available for the next cleaning operation. Periodically, the debris collected by the collection station in the housing must be cleaned. Beyond this, and any needed repair-type maintenance, the system is effectively self operating.

The housing also includes a recharging mechanism. When the mobile unit returns to the housing, a sensory mechanism causes automatic alignment of the vehicle so that a recharging connection on the vehicle will automatically align with and connect to a recharging connector on the housing. In this way, the battery source of power in the mobile unit will be automatically recharged when the unit enters the housing.

The advantages of this type of carpet cleaning system are quite substantial. In areas such as hotels, the mobile unit can be programmed to clean preselected areas during night periods where most of the occupants of the hotel are sleeping. This eliminates a manual chore which previously required a substantial manpower. In a multi-floor hotel with substantial square footage, numerous carpet cleaning personnel were required to daily clean the floors. In this case, a limited number of these carpet cleaning systems can perform the same task, thereby freeing personnel for other occupations or jobs.

In the case of home use, the immediate benefits are obvious in that with a family where the adult people are occupied during the daytime, as for example, in working occupations, school or the like, the carpet cleaning operation can take place automatically, thus freeing the occupants of this household from this otherwise daily and time consuming task.

This invention possesses many other advantages and has other purposes which will become more fully apparent from a consideration of the forms in which it may be embodied. A practical embodiment of the system and the method of cleaning carpets on an automated basis is illustrated in the accompanying drawings and described in the following detailed description. However, it should be understood that these drawings and the following detailed description are set forth only for purposes of illustrating the general principles of the invention and are not to be taken in a limiting sense.

BRIEF DESCRIPTION OF THE DRAWINGS

Figure 1:
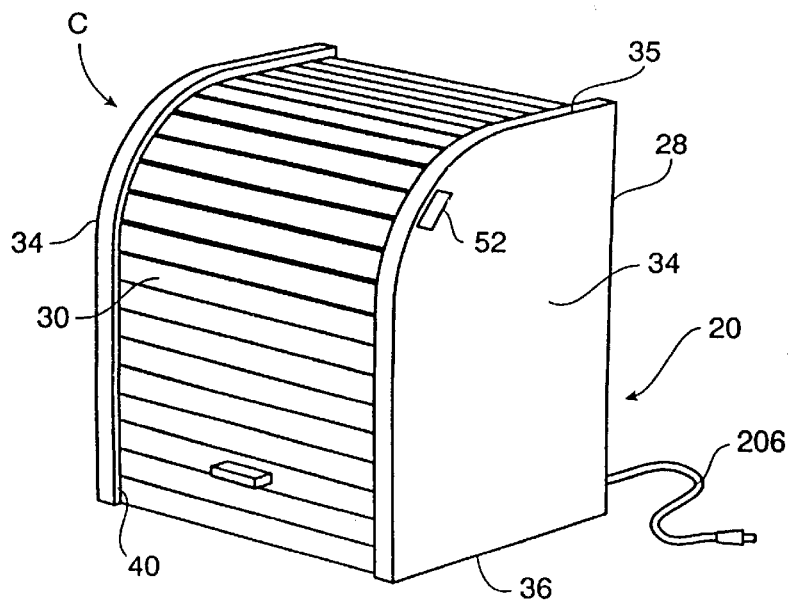
Figure 12:
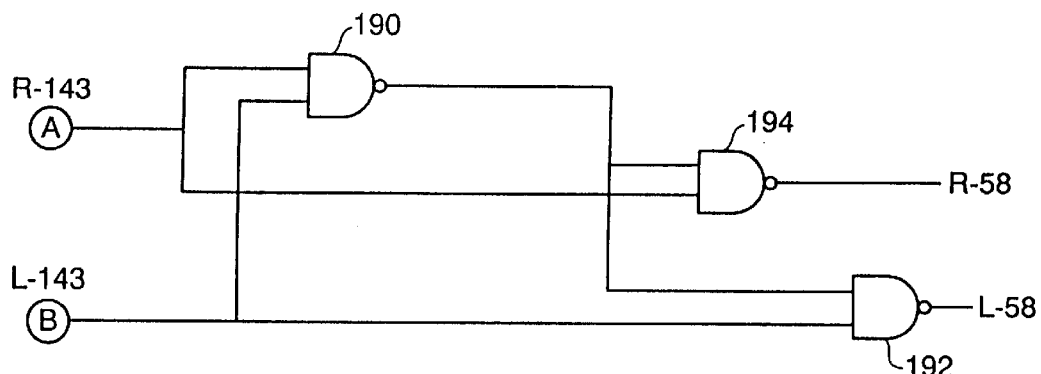
Figure 13A:
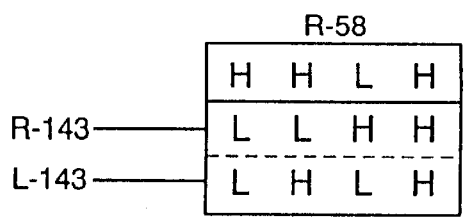
Figure 13B:
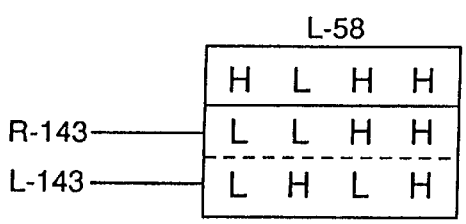
Figure 2:
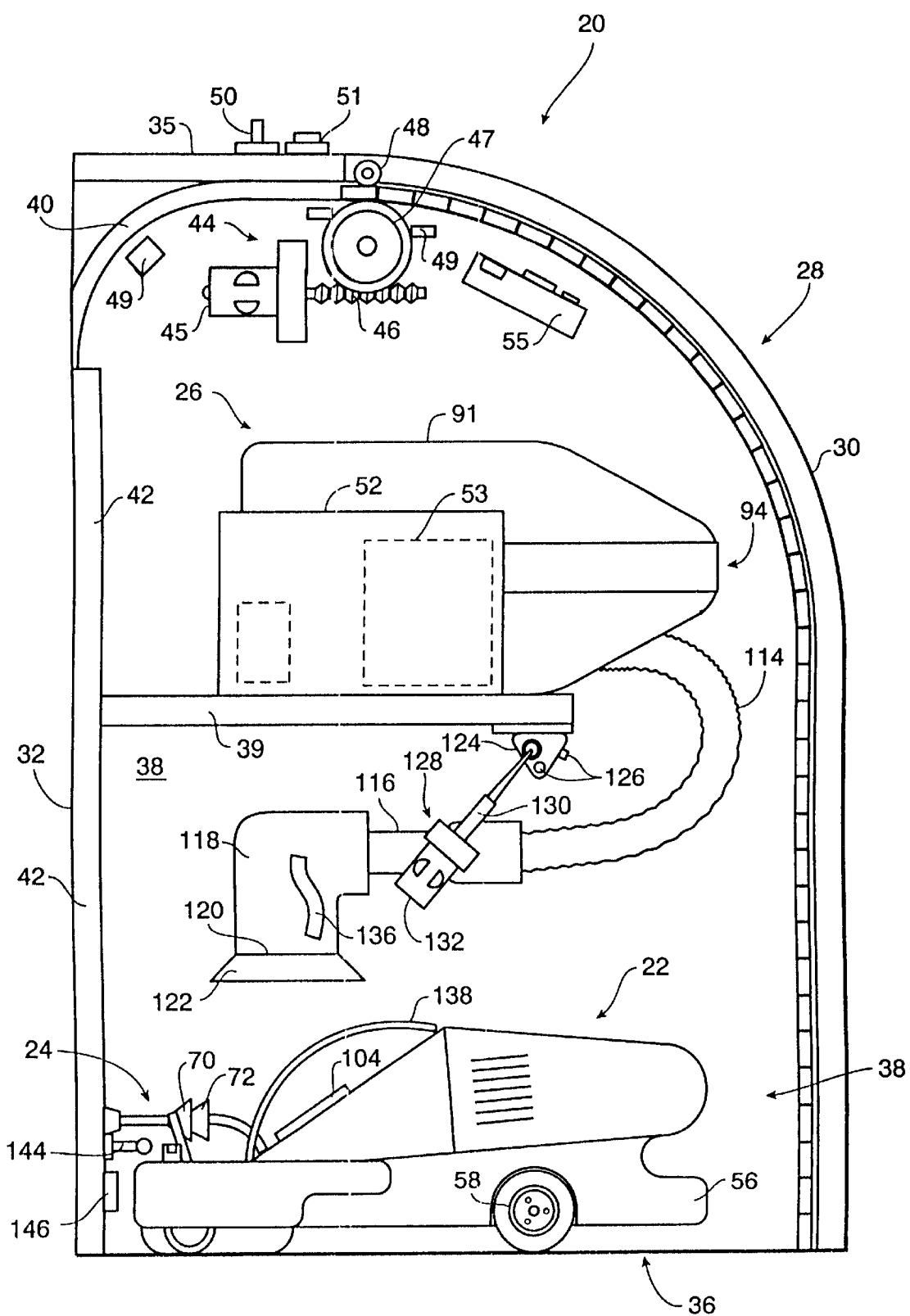
Figure 3:
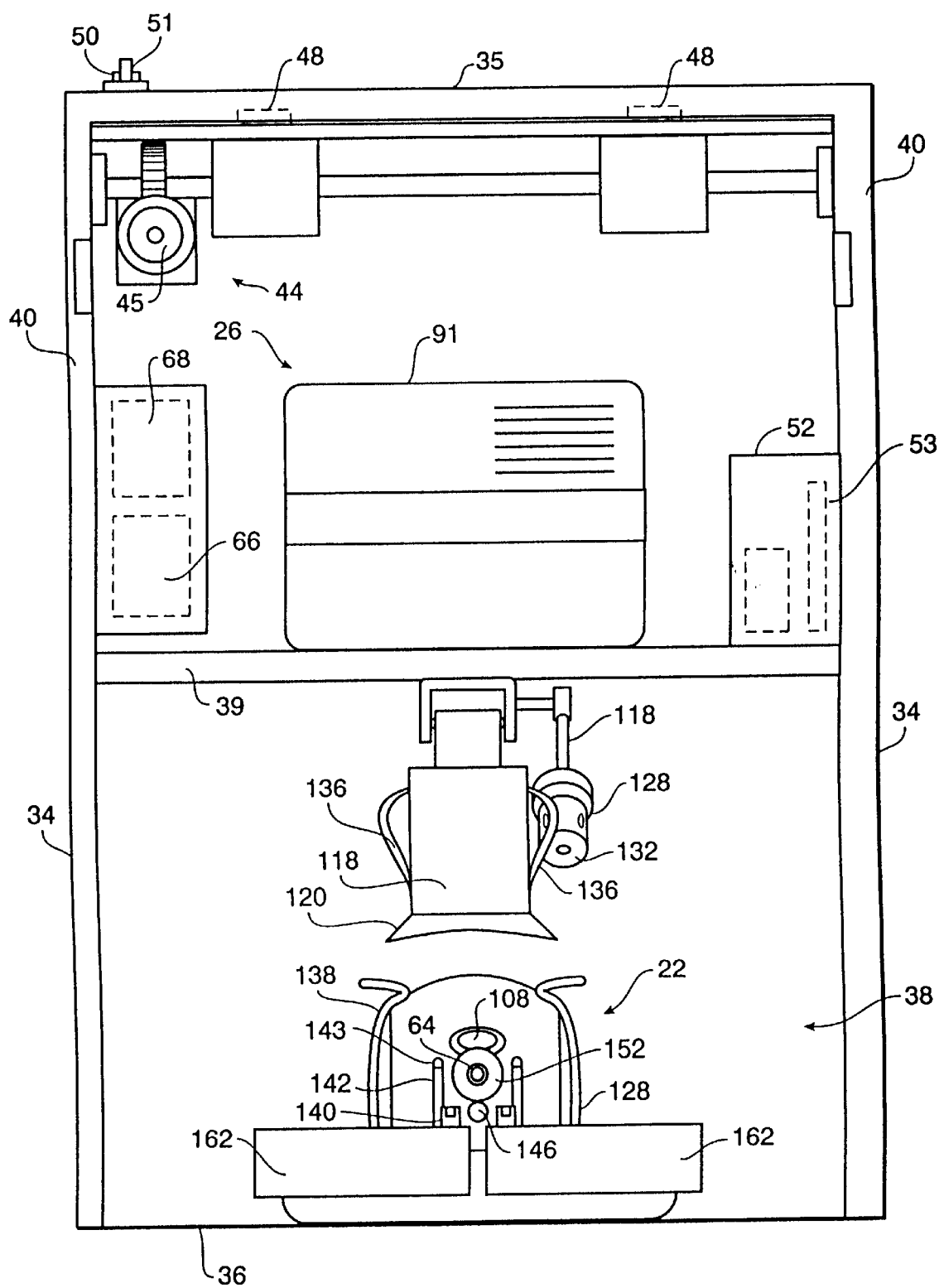
Figure 4:
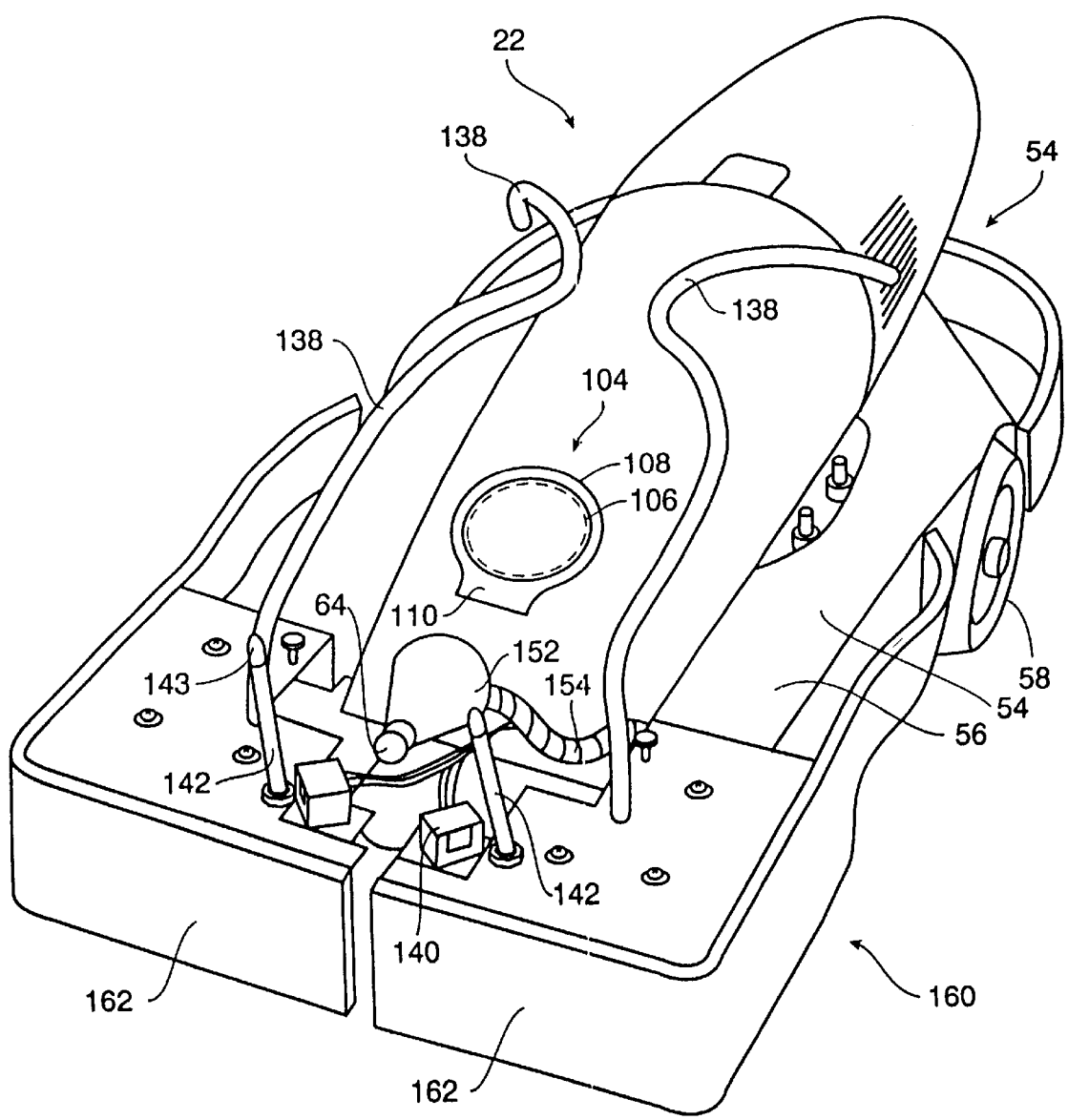
Figure 5:
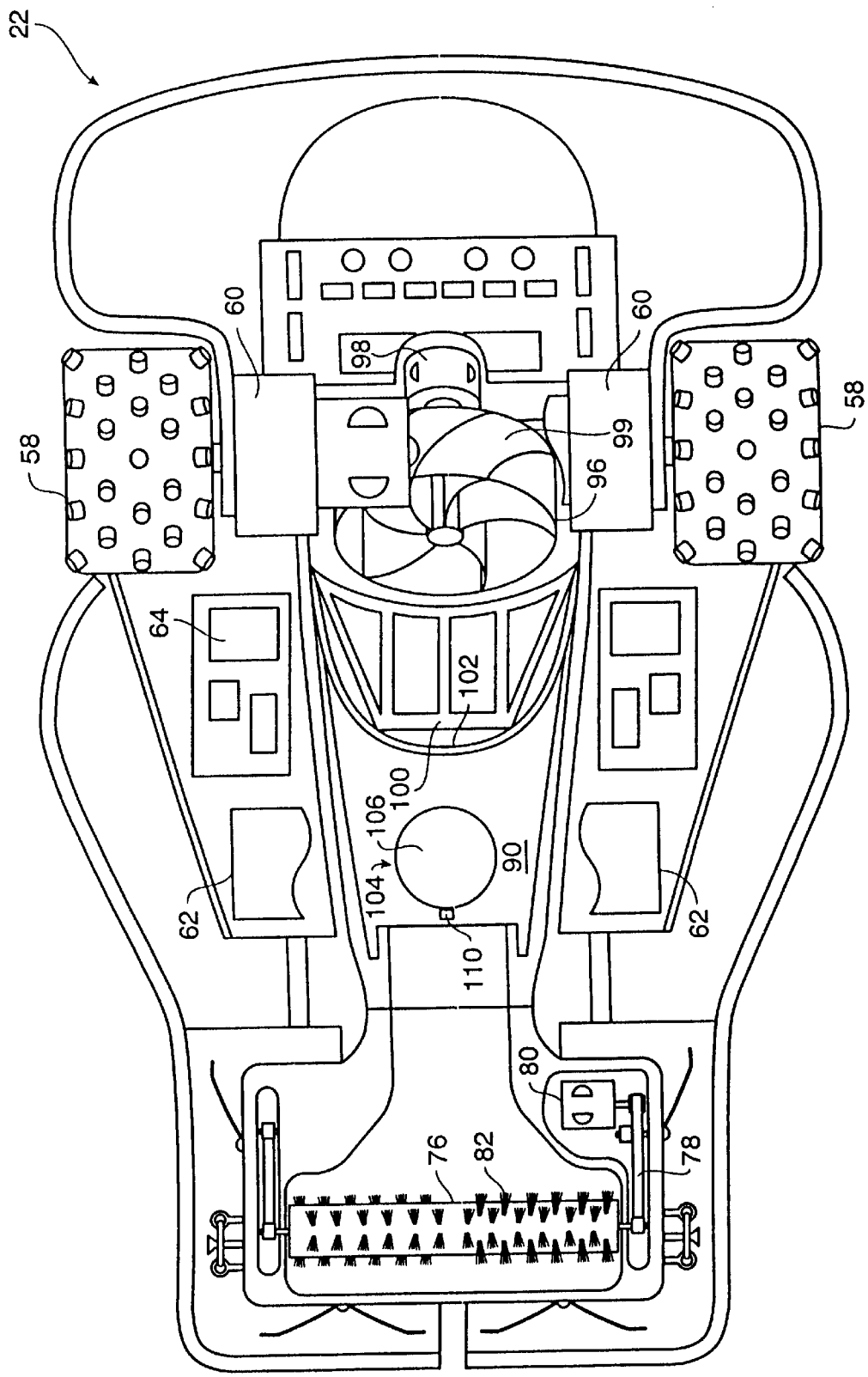
Figure 6:
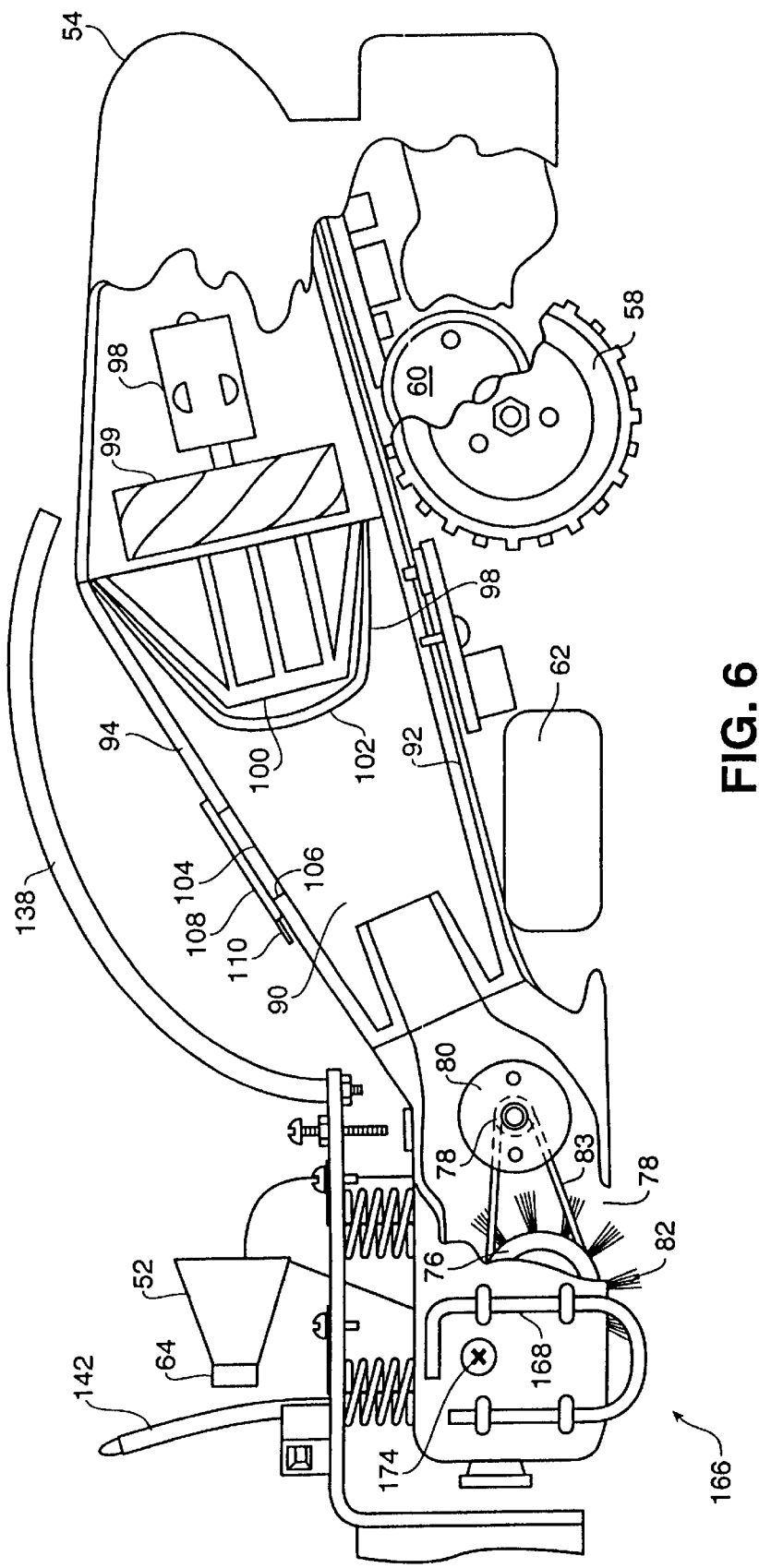
Figure 14:
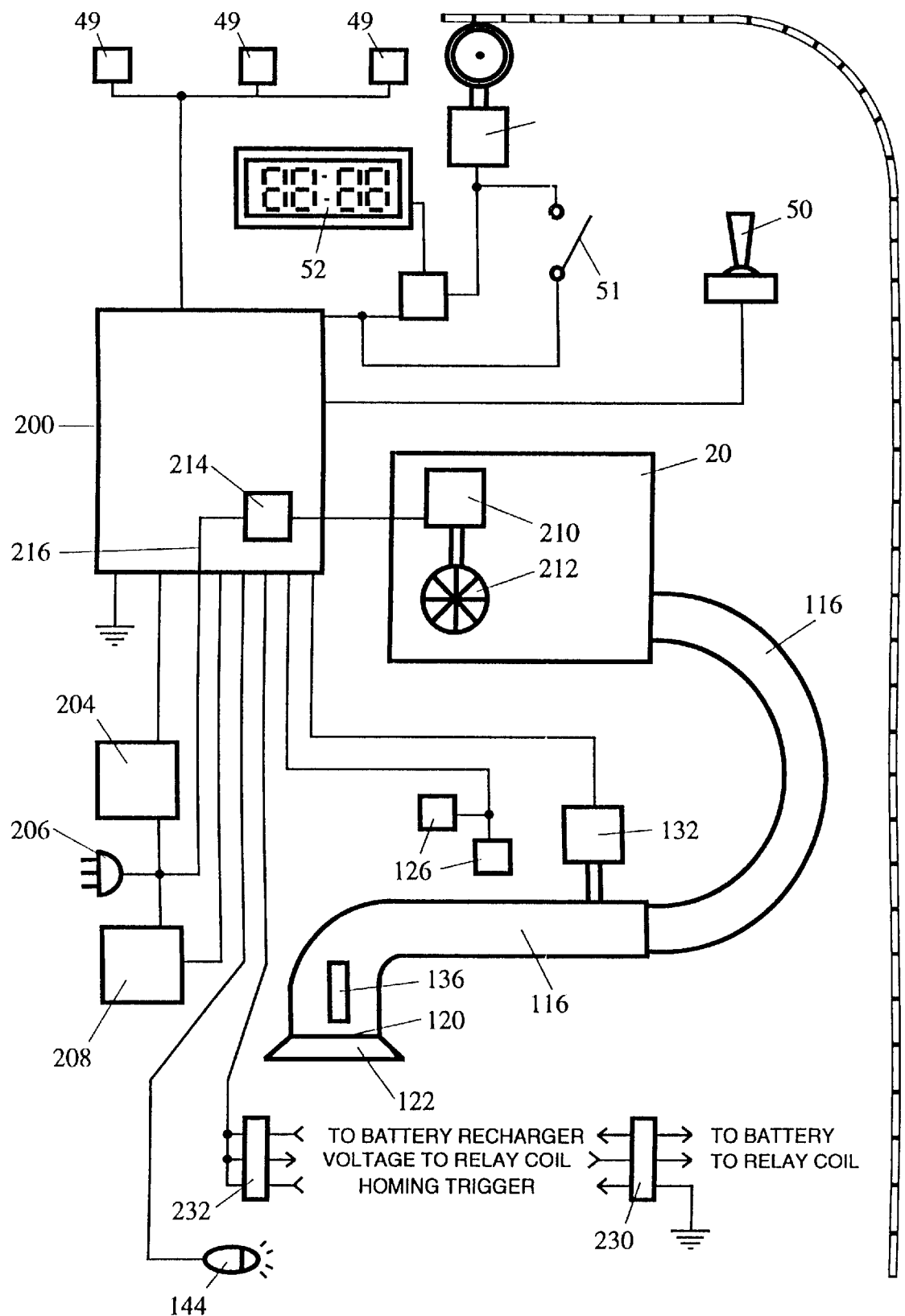
Figure 15:
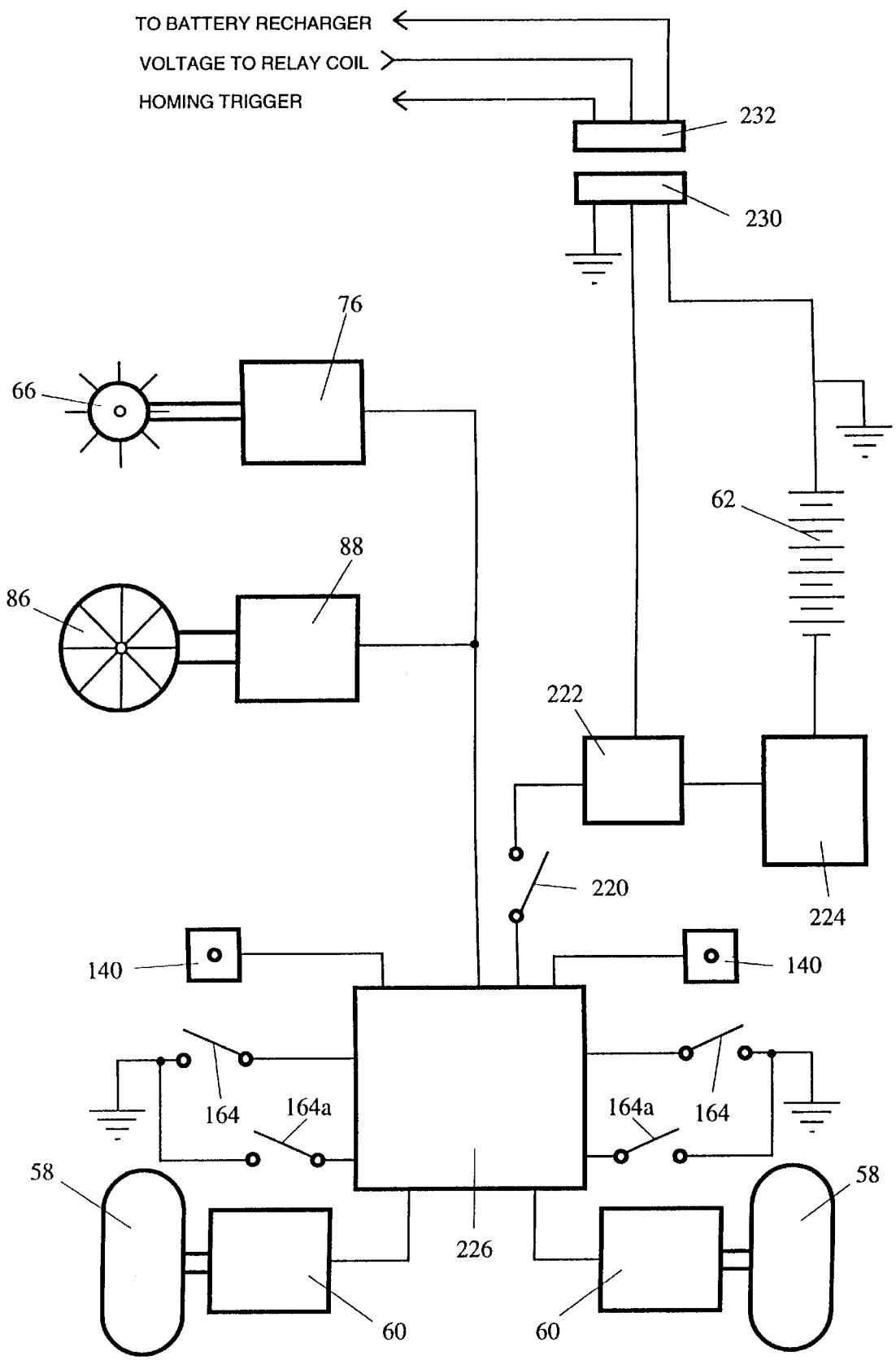
Figure 16:
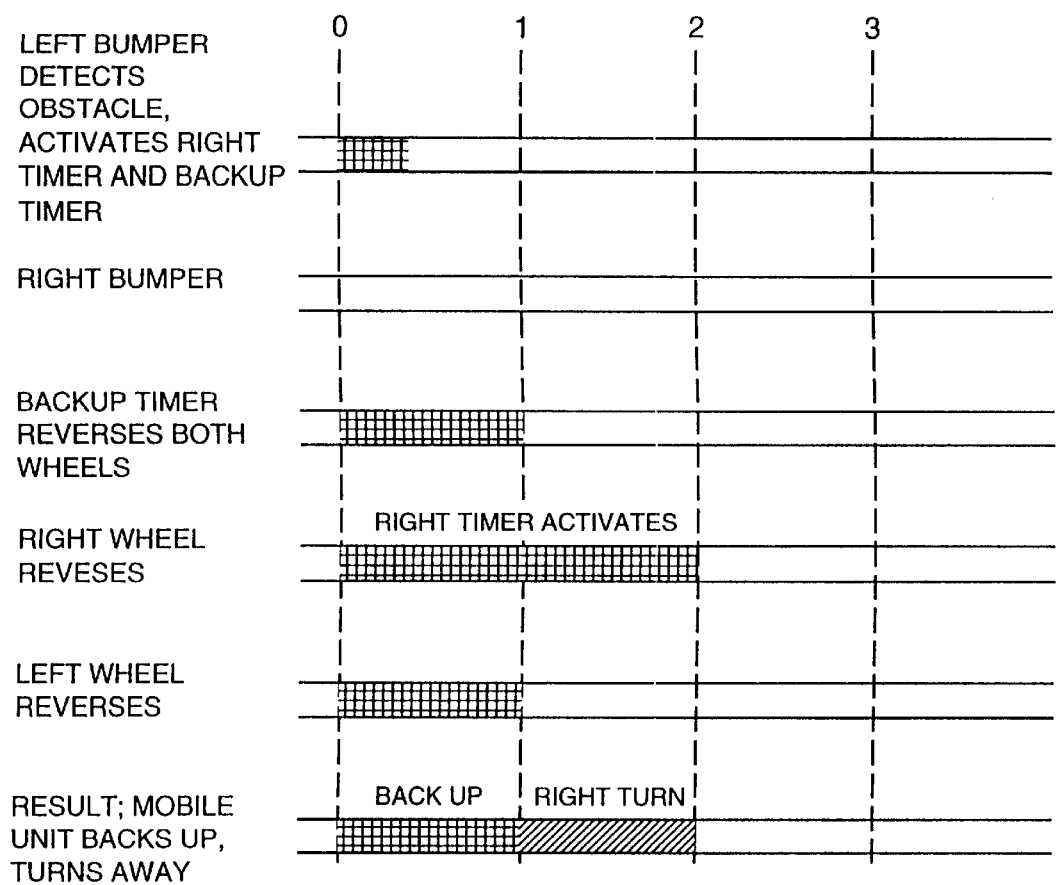
Figure 17:
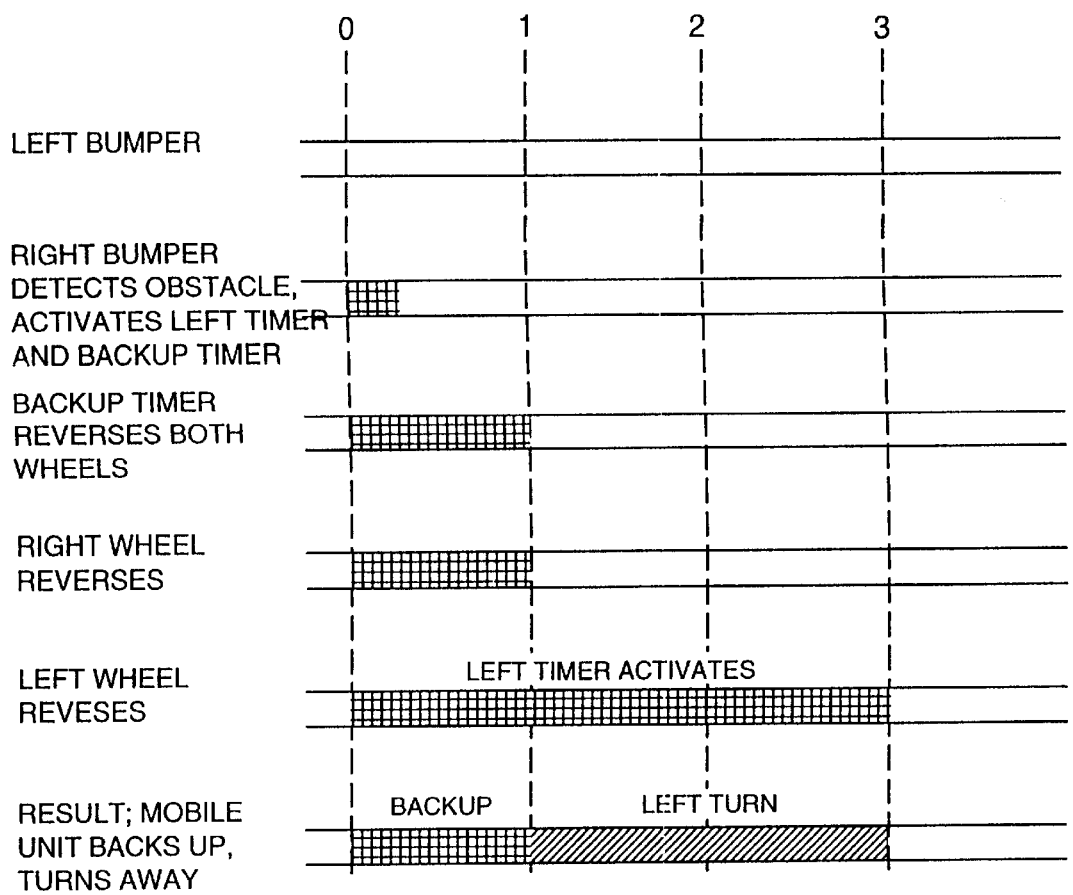
Figure 18:
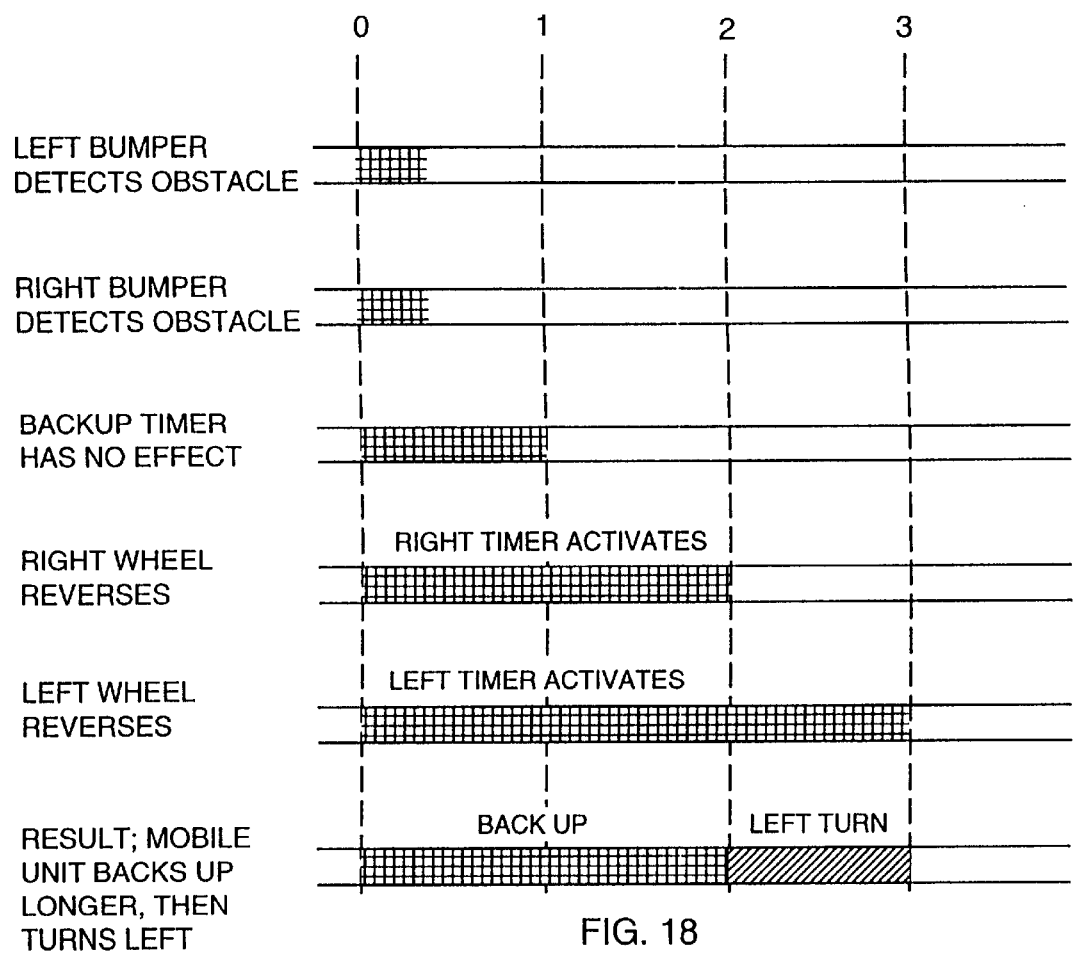
Figure 19:
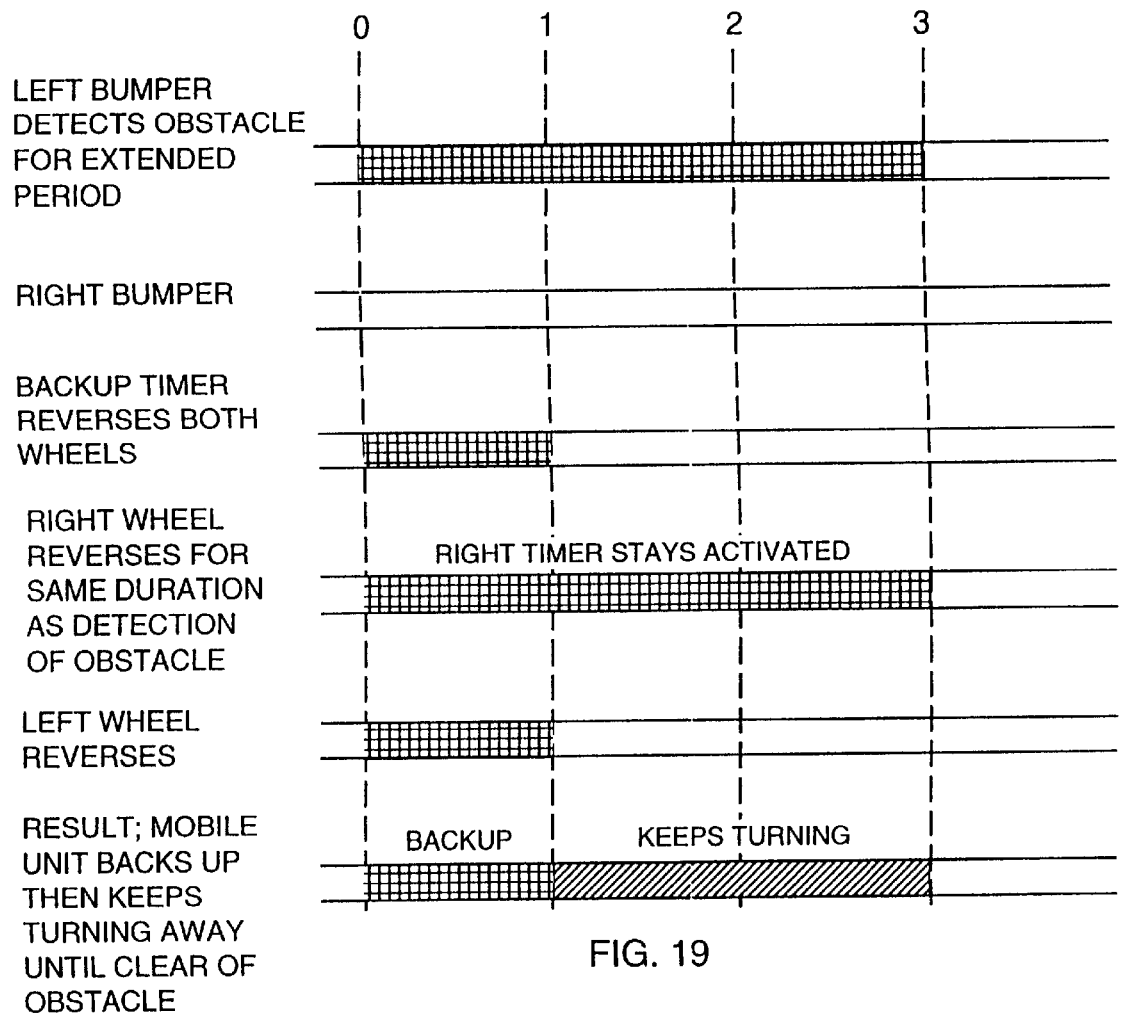
Figure 20:
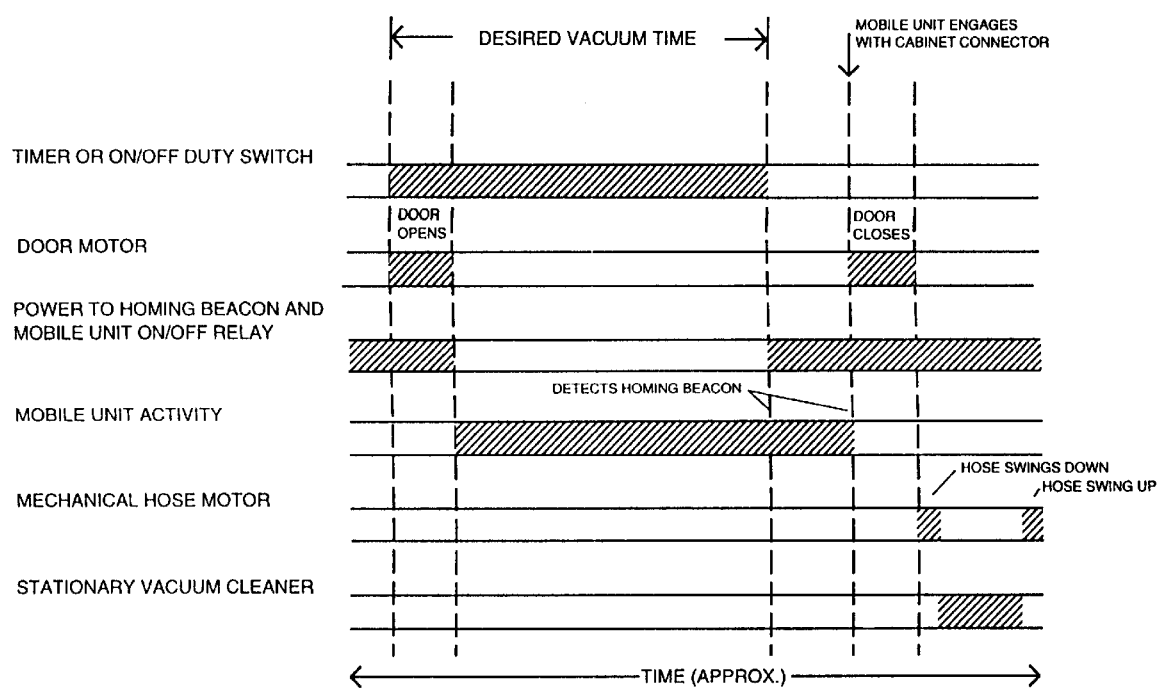

Having thus described the invention in general terms, reference will now be made to the accompanying drawings in which:

FIG. 1 is a perspective view of a stationary housing forming part of the vacuum cleaning system of the present invention;

FIG. 2 is a side elevational view of the stationary housing with a side panel of the housing removed and showing the components in the interior thereof as well as a mobile carpet cleaning unit forming part of the system stored therein;

FIG. 3 is a front elevational view of the stationary housing of FIGS. 1 and 2, with the front door thereof removed and also showing the mobile carpet cleaning unit forming a part of this system, stored within the housing;

FIG. 4 is a perspective view of the mobile carpet cleaning vehicle unit forming part of the system of the present invention;

FIG. 5 is a top plan view largely broken away and showing the interior portion of the mobile carpet cleaning unit of the present invention;

FIG. 6 is a side elevational view, largely broken away, of the mobile carpet cleaning unit of the present invention;

FIG. 7 is a fragmentary, somewhat schematic side elevational view of a portion of the debris collection and removal system used in the mobile carpet cleaning unit;

FIG. 8 is a fragmentary side elevational view showing a portion of a stationary vacuum cleaning system for removing debris from the mobile unit and forming part of the housing of the present invention;

FIG. 9 is a fragmentary perspective view showing part of an obstruction sensory system forming part of the mobile unit in the present invention;

FIG. 10 is a perspective view of a drop-off sensory mechanism forming part of the mobile unit of the present invention;

FIG. 11 is a side elevational view, partially in section, and showing a portion of the obstruction sensory system of the invention;

FIG. 12 is a schematic electrical circuit view showing the electrical circuit used for accomplishing homing functions of the mobile unit;

FIGS. 13A and 13B are truth tables showing high and low conditions in response to the detection of a homing beacon;

FIG. 14 is an schematic electronic circuit diagram showing the electronic components forming part of the housing of the present invention;

FIG. 15 is a schematic electronic circuit diagram showing the electronic components and portions of the mechanical assembly forming part of the vehicle mobile unit of the present invention;

FIG. 16 is a schematic chart showing the sequence of operation when the vehicle unit contacts an obstruction on the left-hand side thereof;

FIG. 17 is a schematic chart showing the sequence of operations when the vehicle unit contacts an obstruction on the right-hand side thereof;

FIG. 18 is a schematic chart showing the sequence of operations when the vehicle unit detects an obstacle on both sides thereof;

FIG. 19 is a schematic chart showing the sequence of operations when the vehicle unit contacts an obstruction for an extended period of time; and FIG. 20 is a schematic chart showing a sequence of operations on the housing of the vehicle unit in the housing forming a part of the system of the present invention.

DETAILED DESCRIPTION

Referring now in more detail and by reference characters to the drawings which illustrate a preferred embodiment of the present invention, C designates a carpet cleaning system comprising a main housing or cabinet 20 for receiving a vacuum cleaning vehicle or "cleaner apparatus" or so-called "mobile unit" 22. Located within the housing 20 is a battery recharging mechanism 24 which is hereinafter described in more detail and a debris collection station 26, as shown in FIG. 2 and which is also hereinafter described in more detail.

The cabinet 20 is comprised of an outer housing 28 having an openable and closable segmented front door 30 which can be opened and closed to permit ingress and egress of the mobile vacuum cleaner unit 22. The outer housing 28 is comprised of a back wall 32 and a pair of transversely extending spaced apart end walls 34 and together with a top wall 35 and a bottom wall 36 along with the front door 30 to form an interior compartment 38.

The cabinet 20 is also provided in the interior compartment 38 with a shelf 39 for supporting the debris collection station 26 in the manner as best illustrated in FIG. 2 of the drawings. It is not necessary in connection with the present invention to have a bottom wall, such as the bottom wall 36 since the entire cabinet 20 could rest entirely on a carpet surface if desired. If the bottom wall 36 is provided, however, it should also include a slight front ramp or beveled edge (not shown) in order to enable the mobile unit 22 to enter into and exit the interior compartment 38 without sensing the bottom wall 36 as an obstruction.

The front door 30 of the cabinet 20 is preferably, although not necessarily, a segmented door, that is, comprised of a plurality of horizontally located slats or ribs which allow the door to bend and travel through an arcuate path. In the embodiment of the invention, as illustrated, the front door 30 is capable of moving along a trackway 40 located on the underside of the top wall 35 and a corresponding channel 42 located adjacent to the interior surface of the back wall 32. Thus, as the front door 30 opens, it will move through an arcuate path along the trackway 40 and into the channel 42 adjacent the back wall, as shown in FIG. 2, When the door moves to the closed position, it will follow the reverse path and move to the fully closed position, as best shown in FIG. 2 of the drawings.

The front door 30 is operated by a door motor mechanism 44, as best shown in FIGS. 2 and 3 of the drawings. The door motor mechanism 44 comprises a small AC operated drive motor 45 which drives a connecting linkage arrangement 46, including door rollers 47, for raising and lowering the door in a conventional manner. Mechanisms of this type are frequently used on a larger scale for raising and lowering garage doors. Accordingly, this mechanism is neither illustrated nor described in any further detail herein.

The door operating mechanism, as shown in FIGS. 2 and 3, will also include door pressure rollers or so-called guide rollers 48 for guiding the movement of the door during its opening and closing movements. Further, door position switches 49 are also located adjacent the trackway in order to detect the position of the door and ensure proper opening and closing movement. The door position switches 49 are also operable to effectively stop the movement of the motor 45 when the door has reached the fully opened and fully closed positions. Finally, a manually operable door switch 50 and a duty switch 51 are also located on the top wall of the cabinet, as best shown in FIGS. 2 and 3 of the drawings.

It should be understood in connection with the present invention that other types of door arrangements could be used. Thus, a hingedly mounted door with a linkage mechanism to open and close a hingedly mounted door could also be provided. Again, mechanisms of this type are frequently used as gate openers and are commercially available.

As indicated previously, a manually operable door switch 50 and the main duty switch 51 are located on the top wall 35 of the housing 20. However, the system of the present invention is adapted for automatic operation. For this purpose, a multi-day programmable timer 55 is employed, as, for example, a seven-day programmable timer. This timer would be manually setable by a user of the system to cause the mobile unit to exit and perform a carpet cleaning operation on selected days and/or at selected times and moreover, for selectable time periods of cleaning. In this way, the entire system is automatically operable. The programmer timer is a simple device which can be easily programmed by setting dial switches or the like, much in the same manner as a programmable water sprinkler system.

Also located within the interior compartment 38 are the electrical components used in the operation of the cleaning system C. Certain of these electrical components will include, for example, a circuit box 52 which houses the circuit boards and other electrical circuitry used in the operation of the system. Fuses, sensors, transmitters and the like would also be located in this circuit box 52. Included within the circuit box 52 is a central processing unit 53 which may contain motor driving circuits and the like.

The cabinet 20 could be a basic housing for the components of the system as described herein. However, it should also be understood that the cabinet itself could be made into a piece of furniture or otherwise, it could form a part of another piece of furniture. Thus, the entire cleaning system would not consume a great deal of storage space, such as closet space which is sometimes at a premium in certain dwelling establishments.

The mobile self driven vacuum cleaner unit 22 is more fully illustrated in FIGS. 4–11 and 15 of the drawings and comprises an outer casing or so-called vehicle chassis 54 mounted on a main frame. The frame itself is not shown in any detail in the drawings and actually may be integrated with the actual casing or vehicle chassis 54. The outer casing 54 and the main frame are typically a single unit and may be an integrated unit, if desired. Furthermore, this casing and the main frame together are frequently referred to as a "body".

A conventional vacuum cleaner chassis could be employed and modified for use in the present invention. Further, some of the components which are conventionally found in vacuum cleaners will only be briefly mentioned herein since, to that extent, conventionally employed components can be used in the mobile cleaner apparatus 22. For example, brush rollers of the type conventionally used in vacuum cleaners will be described to the extent that they exist in the mobile unit of the present invention, but the actual construction of such brush rollers will not be described.

The mobile vacuum cleaner unit 22 comprises a pair of drive wheels 58 which are driven by one ore more battery powered DC drive motors 60, as best shown in FIG. 5 of the drawings. In the embodiment of the invention as illustrated, a separate drive motor 60 is used for driving each of the individual drive wheels 58 so that the two can be operated either in tandem or individually at different speeds and in different directions. In the embodiment of the invention as shown, a separate drive motor 60 is provided for driving each wheel 58. This type of separate drive motor arrangement is preferred in that it easily and inexpensively provides driving control over each of the individual drive wheels.

The drive motors 60 are preferably powered by means of one or more rechargeable batteries 62 mounted within the chassis 54. These batteries could be wet-celled batteries if required, although dry-celled batteries are preferred in order to eliminate any potential damage by virtue of the use of a battery fluid. The batteries 62 are provided with and connected to a recharging plug 64 (as best shown in FIG. 3) for periodically recharging of the batteries after a self cleaning operation by the mobile unit 22 with the battery recharging mechanism 24.

The recharging plug 64 on the mobile unit is operated in conjunction with a battery recharger circuit 66 and a power supply 68 which are also connected to or form part of the battery recharging mechanism 24. The recharger circuit 66 and power supply 68 are also mounted on the shelf 39 within the housing 20, as best shown in FIG. 3 of the drawings. This battery recharging plug 64 is adapted for releasable connection to a recharging assembly 70 having a front nose portion or probe (frequently referred to as a "socket") 72 which receives and causes a recharging coupling to the recharging plug 64. Thus, when the mobile unit enters into the housing 20 in the manner as shown in FIG. 2, the nose 72 will automatically connect to the recharging connector 64 on the mobile unit and thereby enable a recharging of the batteries in the mobile unit. For this purpose, the battery recharger 66 is electrically connected to the recharging connector 70 by means of electrical conductors (not shown).

Mounted within the forward end of the mobile unit 22 is a cleaning brush 76 which extends through an elongate slot 78 formed in the bottom of the chassis or mobile unit cabinet 54. The cleaning brush can be conveniently journaled on the sides of the chassis. Furthermore, the cleaning brush 76 is conventionally provided with bristles 82, as best shown in FIGS. 5 and 6 of the drawings. Mounted at one end of the driven and rotatable cleaning or so-called "agitator" brush 76 is a drive pulley 78 and which is connected to a suitable roller drive motor 80 by means of a drive belt 83, again all as best shown in FIGS. 5 and 6 of the drawings.

It should be understood that the drive motor 80 can be powered by the same battery source of power 62. However, separate batteries could also be provided for operating the roller drive motor 80, which is a DC drive motor. Although the vacuum cleaner is provided with a cleaning brush or so-called "agitator brush 76", driven by a separate agitator brush motor 80, it should also be understood that the agitator brush 76 could be driven by any one of the drive motors 60, if desired. The agitator brush motor 80 is typically a small electric battery powered motor. For this purpose, the motor 80 should be driven from the same battery source of power 62.

Although only a pair of drive wheels 58 are illustrated in the drawings, it should be understood that additional idler wheels or castors could be employed on the apparatus. In one embodiment, the apparatus is constructed so that the combination of the cleaning roller and the pair of drive wheels is sufficient to stabilize the apparatus during movement.

The mobile vacuum cleaning unit 22 is also provided with a temporary storage compartment 90 which operates in conjunction with the debris collection station, or so-called stationary vacuum device 26, in the main housing 20, as hereinafter described. The temporary storage compartment 90 is formed by a continuous enclosing wall 92, and an upper guide plate 94 and which is in communication with the drive roller cleaning agitator brush 76. Thus, as debris is collected from the carpet, a vacuum created in the storage compartment 90 will cause any dust or debris to move into the storage compartment 90. A vacuum is formed in the storage compartment 90 by means of a suction fan 96 operable by a suitable electric motor 98. Again, the same motor 80 which drives the cleaning brush 76 could be used for operating the suction fan 96, if desired. The suction fan 96 is surrounded by a shroud 99, which forms a debris collecting area, and the latter, having openings therein for effectively creating a vacuum through the storage compartment and shroud 98, as hereinafter described. In this way, the dust and debris collected by the agitator brush 76 is moved into the storage compartment 90.

Located in front of the shroud 99 is a filter cage 100 and also holds a filter 102, such as a replaceable conventional filter cloth. In this way, none of the debris which is drawn into the waste chamber 90 can be drawn into the suction fan motor 98.

The debris collection station 26 includes a stationary vacuum cleaner canister 91 and which is mounted on the horizontally disposed shelf 39 mounted within the housing 20, as best shown in FIGS. 2 and 3. The vacuum cleaner canister 91 is provided with an internal chamber and an internal vacuum motor and fan arrangement (not shown) required for creation of the vacuum. However, any conventional means for forming the vacuum in the canister 91 may be employed in accordance with the present invention.

A debris outlet 104 on the mobile unit 22 comprises an opening 106 formed in the chassis and which is covered by a rubber flapper-type valve 108. The rubber flapper-type valve or so-called "flapper" may also be provided with an outwardly struck tab 110 for purposes presently more fully appearing and as best shown in FIG. 4.

The debris collection station 26 within the housing 20 is provided with a flexible tube 114 connected to a source of vacuum within the canister 91 (see FIGS. 2 and 8). Moreover, the vacuum tube 114 is connected at its outer end to a rigid arm 116 having a perpendicularly arranged stub section 118 terminating in a debris collection inlet 120, as best shown in both FIGS. 2 and 8 of the drawings. The debris collection inlet 120 is surrounded by a rubber ring or seal 122, as also shown in FIGS. 2 and 8.

When the mobile cleaning unit 22 is moved into the housing 20, the debris collection station will be automatically energized through the control system, as hereinafter described. This debris collection station 26 includes a somewhat universal pivot 124 having a plurality of mechanical hose position switches 126 which detect and provide information as to the knowledge of the rigid arm 116 which is often referred to as a "mechanical hose". An extendable gear motor assembly 128 is comprised of a screw-type jack arrangement 130 and an electric drive motor 132. As the motor 132 is energized by the control system, the screw jack arrangement 130 will cause a lowering of the rigid arm 116 and the stub section 118 such that the debris collection inlet 120 will move toward the flapper value 108 and debris outlet 104 in the mobile unit. As this occurs, the flapper valve 108 is caused to open by a suction or vacuum created through the vacuum tube or vacuum hose 114 and the rigid arm 116 and stub arm 118. This will cause a removal of debris temporarily stored in the chamber 90 of the mobile unit and cause a relocation of this debris in a storage chamber (not shown) in the stationary vacuum unit 91.

The operation of removing the debris from the mobile unit and relocating same in the stationary vacuum unit 91 is caused by a sensory arrangement on the mobile unit and on the housing. As an example, when the mobile unit reaches the nested position as shown in FIG. 2, it connects with the cabinet connector. This will cause a signal to the microprocessor to thereupon enable operation of the debris collection station 26.

It should also be understood that discharge of debris from the mobile unit could be initiated by causing energization of the fan 96 in the reverse direction, and thereupon causing air to blow the debris in the canister 91 outwardly through the debris outlet 104 of the mobile unit. It can be seen that energization of the fan 96 in the reverse direction will cause an air flow through the shroud 98 and filter arrangement.

The aforesaid construction is highly effective in that it only requires the mobile unit to maintain a relatively small temporary debris storage area. This is due to the fact that the storage area 91 will be cleaned and the debris will be removed therefrom on each occasion when the mobile unit returns to the main housing 20 or otherwise on a periodic basis. In addition, the debris collection station 26 may be sufficiently large so that it only requires cleaning and emptying on an occasional periodic basis. As a simple example, the mobile unit may be operated for seven to ten days, or more, and the debris from the mobile unit collected in the main stationary vacuum cleaner station chamber 91 such that only very infrequent cleaning of the chamber 91 is required. Moreover, the cannister 91 may be conveniently removable from the shelf 39 for purposes of emptying the same on a periodic basis.

The universal pivot mechanism 124, as shown in FIGS. 2 and 8, is also operable with the plurality of position switches 126 and which will control the operation of the electric motor 132. Thus, after the rigid arm 116 is raised to a certain position, it will contact one of the position switches 126 which will, in turn, cause a de-energization of the motor 132. It should also be understood that the motor 132 will be operable from a suitable source of electrical current supplied to the main housing 20, as hereinafter described.

The stub 118 is provided on each of its opposite sides with positioning guides 136, or so-called "feelers", as best shown in FIGS. 2 and 3 of the drawings. These positioning guides 136 will bear against a pair of upstanding locating rods 138 (see FIGS. 2, 3 and 4) located on the vehicle chassis 54. Thus, as the stub 118 is lowered, the positioning guides 136 will bear against the interior surface of these locating rods 138 and cause the debris collection inlet to be properly oriented with respect to the outlet 108.

It can be seen that this universal pivot assembly, as best shown in FIGS. 2 and 3, allows the stub 118 and ring seal 122 and hence the inlet to be moved from here to side, in order to compensate for the varying angles that the mobile unit may achieve when homing into the housing. Moreover, this assembly also allows for correction of the vertical positioning of the stub 118 when positioning with respect to the outlet 104. The flapper valve 104 is opened when the mechanical assembly, including the stub 118 is shifted downwardly, by pressing against the guide arms 138. These guide arms 138 are mounted in such manner that they also operate as feeler switches which sense the downward movement of the hose assembly toward the opening 104. These feelers could be arranged to cause energization of the electric motor 98 and hence the fan 96, if desired.

The mobile unit may also be provided on the chassis 56 with a pair of upstanding homing arms 142. These homing arms could also be electrically connected to the drive motor 60, causing selective energization and de-energization of these drive motors 60 to thereby further guide the mobile unit into a homing position. Also, additional infrared detectors 143 could be mounted at the upper end of these arms 142.

In addition to the foregoing, the stationary vacuum source within the cabinet 20 can also be activated in order to cause a suction and hence an opening of the flapper valve 100 through the action of the guide arms 138. The rubber ring seal 108 will allow a tight-fitting disposition around the debris outlet 104 thereby maximizing the air flow through the filter and waste chamber. In this respect, the shroud 98 may also operate as a filter, as well.

The mobile unit also comprises a pair of on-board infrared sensors or so-called detectors 140 and which are, in turn, secured to the chassis 54. These infrared sensors operate in conjunction with an infrared homecoming beacon mechanism 144 within the housing 20, as best shown in FIG. 2. The infrared homecoming beacon operates in conjunction with an infrared signal generating mechanism 146 mounted within the housing and the front surface of which may serve as a bumper for engaging the forward end of the mobile unit, as also shown in FIG. 2.

Upon completion of a duty cycle or so-called "cleaning cycle", the infrared homecoming beacon, which may be in the form of light emitting diodes, will generate infrared signals. As these signals are detected by the on-board infrared sensors 140, the mobile unit will be instructed to immediately return to the cabinet. Moreover, the infrared beams which are generated by the beacon 144 will cause the mobile unit to move into the cabinet in substantially the precise desired orientation so that it aligns properly for connection to other components, as hereinbefore and hereinafter described.

When the mobile unit has reached its so-called "home" or "nesting" position, as illustrated in FIGS. 2 and 3, the battery source of power 62 will be automatically energized through the recharging socket 72. In this case, the recharging plug 64 is adapted to engage and to extend into the charge receptacle of this socket 72 mounted within the housing, as also best shown in FIG. 2. Thus, it is not necessary for the mobile unit to be precisely aligned inasmuch as the charge receptacle is somewhat funnel-shaped and will guide the charging plug directly into the funnel-shaped charge receptacle socket 72.

By reference to FIG. 4, it can be seen that the charge plug 64 is mounted on a frusto-conically shaped section 152 on the mobile unit and is connected to the battery 62 by means of a cable 154.

If for some inexplicable reason, the on-board infrared sensors on the mobile unit did not detect the homing beam emitted by the infrared beacon in the housing, there would be no cause for concern since the battery source of power 62 would ultimately drain and the mobile unit would halt so that the user thereof could manually reposition the mobile unit in the housing, if required.

When the infrared beam is generated by the beacon 144 to enable a homing of the mobile unit 22, the mobile unit will cross the homing beacon beam. That beam will, in turn, be detected by one or both of the infrared sensors 140. If the infrared homing beam is detected by the right-hand sensor 140, power will be cut to the right drive wheel 58. In like manner, if the beam is detected only by the left sensor 140, power will be temporarily cut to the left drive wheel 58. This will cause the mobile unit to turn towards the infrared homing beacon. When both detectors sense the homing beacon, no signal is sent to relays controlling either of the drive wheels and the unit will then move toward the housing. If the mobile unit happens to veer too far to the right, only the left sensor will sense the presence of the beam and the left wheel will temporarily stop rotating, again until both sensors or detectors further sense the homing infrared beam, at which point, motion is restarted again.

FIGS. 9–11 more fully illustrate an obstruction detection system 160 forming part of the mobile unit 22. The obstruction detection system in this embodiment of the invention relies upon a pair of bumper pads 162 at the forward end of the mobile unit vehicle as shown in FIG. 4. These bumper pads 162 usually include a soft flexible exterior surface, such as a foam exterior surface to preclude any marring or other damage to a piece of furniture or other item, if they should engage such other item.

Located immediately behind each of the bumper pads 162 are bumper contacts 164 (FIG. 9) which are electrically connected to relays and which, in turn, control the motors 60 operating the drive wheels 58. These contacts are, in turn, electrically wired together and to electrical relays which are contained within an electrical circuitry box 226 as hereinafter described, (see FIG. 15) and located within the chassis 54 of the mobile unit 22. If the mobile unit should be traveling in a generally forward direction and one of the bumper pads 162 contacts an obstruction, such as a piece of furniture, it will immediately close the associated contact 164 thereby opening the relay to the drive motor 60 associated with that bumper pad 162. Thus, if the right bumper pad 162 contacts the obstruction, the left bumper remains neutral. The right drive motor 60 will reverse direction and cause the mobile unit 22 to move in a different angulated direction. This will potentially enable the mobile unit to move beyond the obstruction which it contacted. In like manner, if the left bumper pad 162 contacts an obstruction, the same action will take place except on the left-hand side of the mobile unit. This operation is described in more detail hereinafter.

If both bumper pads should engage an obstruction, substantially at the same time, then relays to both drive motors 60 will be de-energized thereby momentarily stopping movement of the mobile unit. One of the drive motors will then be caused to reverse in direction so that the mobile unit again moves in a different direction. Even though the mobile unit may engage the same obstruction on a few subsequent occasions, continued operation of the obstruction detection system will ultimately cause the mobile unit to move in a path sufficiently different from that which would again cause engagement with the same obstruction. Moreover, due to the fact that there is a soft covering on the front surface of the bumper pads 162, there is little or no chance of any damage to a piece of furniture or other item which may constitute the obstruction.

Closely associated with the obstruction detection system 160 is a drop-off detection system 166 which is more fully illustrated in FIG. 10 of the drawings. The drop-off detection system 166 comprises a somewhat U-shaped sensing member 168 which is loosely retained in eyelets 170 mounted on the sides of one or both of the bumpers 162. In this respect, it should be understood that a separate drop-off detecting mechanism will normally be located on each of the opposite bumpers 162 on the mobile vehicle. The detecting member 168 will normally remain in a position very closely located to the ground surface on which the unit is riding. Moreover, the U-shaped member 168 is provided with an upper retaining arm 172 limiting the downward movement of the detecting member 168. Moreover, it can be observed that each of the drop-off detectors 166 are located toward the forward end of the mobile unit in advance of the driving wheels 58.

If the mobile unit should be moving toward an area where there is a drop-off, as for example, in a set of stairs, or even a single stair, the detector member 168 will immediately sense a drop in that the lower portion thereof which normally engages the ground surface will be caused to lower even further. As this occurs, the retaining arm 172 will engage a screw contact 174 which will immediately de-energize both of the electric drive motors 60 and thereby immediately stop rotation of the drive wheels 58. Thereafter, the control circuitry will cause a sequence of operations which are similar to those when the mobile unit contacts an obstruction. However, the control circuitry could be configured to cause a reversal of the drive motors 60 and hence the drive wheels 58 to cause the mobile unit to move away from the drop-off, if desired. Further, one of the motors will then be operated while the other is temporarily halted so that the mobile unit will move into a different path. If the mobile unit should still move toward the drop-off, the same sequence of actions will take place as when an obstruction is contacted, until the mobile unit is sufficiently angulated to a different path so that it avoids the drop-off.

By further reference to FIGS. 9 and 10, it can be seen that the drop-off detection system 166 and the obstruction detection system 160 are both electrically connected together. By reference to FIG. 11, it can also be seen that a tie-down cord 176 is used to anchor the bumper pads in a suspended fashion around the contacts in such manner that they do not engage the contacts-until an obstruction is engaged. The tie-down is preferably an electrically non-conductive nylon string or the like. In this construction, the bumper pads will be spaced from the electrical contact, such as the contacts 164, until they engage an obstruction and this obstruction causes the movement of the bumpers into electrical engagement with the contacts.

But with reference to the drop-off detection system 166, the height of the drop-off connectors can be adjusted by means of an adjustment bolts, as hereinafter described, to thereby raise or lower the position of the bumper pad and thereby adjust the normal riding position of the drop-off detection.

A tie-down mechanism 180 is more fully illustrated in FIG. 11 of the drawings and shows the relationship of the bumper pad 162 relative to the front portion of the chassis 54. It can be seen that the bumper pad 162 is spaced from the chassis 54 by means of compressible springs 182 between the chassis 54 and bumper pad 162. Each spring is, in turn, secured to the bumper contacts 164. Moreover, it can be seen that tie-down cable 176 effectively holds the bumper pads in a suspended position around the various contacts but spaced apart from the contacts.

FIG. 12 illustrates in schematic format, a NAND gate arrangement which causes the operation of the drive motors 60 and hence the drive wheels 58 in response to operation by the infrared homing detectors 143. FIG. 13 more specifically illustrates a first NAND gate 190 which receives an input from the right homing detector 143 designated by "R-143" in FIG. 13. A second NAND gate 192 receives an input directly from the left infrared homing detector 143 designated as "L-143" in FIG. 13. Moreover, the NAND 190 receives an input from the left homing detector L-143 and the NAND gate 192 similarly receives an input from the output of the NAND gate 190, but does not receive an input directly from the right-hand homing detector R-143.

There is a further NAND gate 194 which receives an input from the right-hand detector R-143 and from the output of the NAND gate 190, as also shown in FIG. 12.

In accordance with this NAND gate arrangement of FIG. 13, it is possible to set up truth tables which will control the driving movement of the right-hand drive wheel, for this purpose designated as R-58, or the left-hand drive wheel, for this purpose designated as L-58, in FIGS. 13A and 13B of the drawings. In accordance with the truth tables shown in FIGS. 13A and 13B, if a high "H" is generated, the drive motor 60 for that drive wheel 58 will be energized. In like manner, if a low "L" is generated, then an L drive signal will discontinue power to the drive motor 60 associated with that particular drive wheel.

Returning again to FIG. 13A, it can be seen that if the right-hand detector R-143 is positive, and the left-hand detector L-143 is negative, a pair of lows L will result which will, in turn, operate in a high H for motor operation of the right-hand drive wheel. In like manner, if the right-hand detector R-143 is negative, and the left-hand detector L-143 is positive, a high will be generated and in which case, the right-hand motor will be energized. The same holds true for the remaining two possibilities in FIG. 13A.

Returning to FIG. 13B, it can also be seen that if the detector R-143 and L-143 are both negative, lows L will be generated and the left-hand motor 60 which drives the left drive wheel L-58 will be energized. In like manner, if the right-hand detector R-143 does not detect a homing signal but the left-hand detector L-143 does detect a homing signal, then there will be a low for the left-hand drive motor L-58 such that it will not be energized. Again, the remaining two possibilities in the truth table of FIG. 13B show a high or energization of the left-hand drive motor L-58.

In short, when a detector on one side detects an infrared signal, and the other side does not, then power to one motor will be discontinued to turn the mobile unit. Thus, power to the right drive motor is discontinued only when the right hand detector sees an infrared beam. Power to the left drive motor is cut only when the left detector sees an infrared beam. If both detectors detect the infrared signals, both drive motors will remain powered. In all other conditions, both wheels are powered. By following the truth tables of FIGS. 13A and 13B, it can be seen how the drive motors 60 will cause movement of the drive wheels 58 to thereby cause the mobile unit to change its drive path.

It can be seen that the AND gate circuit of FIG. 12 along with the associated truth tables of FIGS. 13A and 13B control the operation of the drive motors and hence, the guiding movement of the mobile unit for purposes of homing the unit into the cabinet. However, similar arrangements of this type could also be used for driving the live wheels in response to external conditions. As an example, a similar AND gate arrangement, along with an associated truth table, could be employed to control movement of the drive wheels in response to the bumper pads engaging an obstruction. Thus, if the left-bumper pad contacted at an obstructions, a similar AND gate arrangement would cause operation of one of the drive motors in preference to the other of the drive motors.

FIG. 14 represents a simplified schematic electrical diagram showing connection of the major components forming part of the housing 20 and FIG. 15 is a similar simplified schematic electrical circuit view showing the connection of those components forming part of the mobile unit 22 of the cleaning system of the present invention. In this respect, it should be understood that many of the components, as for example, a battery recharger, power supply, relays and the like are conventional and are therefore neither illustrated nor described in any detail herein. However, it is the actual combination of these various components which does produce the unique results in accordance with this invention.

Turning now to FIG. 14, it can be seen that the housing 20 includes the plurality of door position switches 49 (three as shown) which detect and control the movement of the door 30. In the preferred embodiment, three of the door positions switches 49 are employed where one is used to control the closing and opening position, the second is used for a duty cycle and the third is used for maintenance. However, if desired, all three door positions which could operate successively to control movement of the door between the fully closed and fully opened positions. Thus, if all three switches 49 are closed as the doors move to the opened position, then the door motor 47 will automatically become de-energized. In like manner, if the right-hand end of the three switches 49, as illustrated in FIG. 14, is opened or otherwise closed (depending upon the mode of connection) then the door 30 will have reached the fully closed position, as now shown in FIG. 14.

The electrical circuitry also includes a central processing unit 200, which may be a microprocessor, which controls the operation of the major components in the housing 20 and may also control the mobile unit 22, as well, if desired, through remote control. The central processing unit 200 operates in conjunction with a plurality of relays, two of which are illustrated in FIG. 14, as hereinafter described. One of these relays is a timer relay 202 which controls the door motor 47. Moreover, connected to the relay 202 is the programmable timer 55. In accordance with this construction, the user of the system can program those times in which it is desired to have the mobile unit automatically start a cleaning operation and end a cleaning operation. In the same respect, the user can program the amount of time during which a cleaning cycle will last.

The microprocessor or central processing it 200 could also be used to control many of the operations of the mobile unit and the overall housing. For example, the microprocessor could be used to receive detect signals from bumper pads and the like or for that matter detect or non-detect signals from the homing detectors. The microprocessor would thereupon be used to control operation of the drive motors 60. Again, the microprocessor could be used to perform other control functions, as described herein.

The starting circuitry, which includes the door motor 47 and the relay 202, as well as the timer 55, also includes the main duty switch 51. In this way, it is possible to de-energize the entire system by opening the duty switch 51 and leaving the same in the opened position.

The housing is further provided with the door switch 50 which allows the user to temporarily hold the door 30 in a fully opened position. This is desirable for cleaning and maintenance, as well as to clean out the reservoir of the stationary debris collection station 26.

The electronic circuitry in the main housing includes a power supply 204 of generally conventional construction and which is designed to operate the various components forming part of the housing 20 at a pre-determined voltage level. Further, the power supply, as well as some of the other components, are connected directly to a conductor 206 for connection to a suitable source of electrical power. In like manner, a battery recharger 208, is connected directly to the charge receptacle or connector 70, and is also connected directly to the power supply 204.

The stationary debris collection station 26 includes a fan motor 210 operating a fan 212 to create the vacuum through the hose or tube 114, as previously described. The fan motor 210 is connected to a vacuum relay 214 operable by the central processing unit 200 and which is also connected directly to the conductor 216 for receiving a source of electrical power, such as one hundred and ten volt electrical power.

The arm 116 of the mechanical hose assembly is operable by the motor 132, which is connected directly to the central processing unit 200 and the actual position of which is controlled by the mechanical position switches 126.

Finally, the infrared lighting emitting diode which generates the homing beacon 144 is also connected directly to the central processing unit 200 for controlling the operation when the mobile unit has reached the nesting position. If desired, the light emitting diode could be operated from a separate generator connected directly to a relay, which is, in turn, operated by the central processing unit 200.

It should be understood that the central housing 20 would also include other electrical components normally conventionally found in control circuits, as for example, twelve volt transformers, battery control circuits and the like. However, these components are essentially conventional and are therefore not described in further detail herein. The control circuitry would also include fuses and potentially other electrical control elements.

The mobile unit control circuitry is set forth in FIG. 15 which also constitutes a simplified electrical circuitry diagram. Certain switches and relays which form part of the circuitry, both in the main housing 20 and in the mobile unit 22, have been deleted from FIGS. 4–10 in order to maintain clarity. Furthermore, it should be understood that other circuit arrangements could be used in accordance with the present invention. Thus, and in this respect, many of the components could be substituted by electronic components which may also be included within the central processing unit, as hereinafter described.

The agitator brush 76 is operated by the agitator brush motor 80 and the vacuum fan 96 is operated by the fan motor 98, as previously described. A main power switch 220 may also be provided on the mobile unit in order to temporarily stop any operation of the mobile unit or to cause automatic starting of the operation of this mobile unit. The mobile unit includes a relay 222 which is a normally energized relay and operates in conjunction with a circuit breaker and beeper combination 224. By reference to FIG. 15, it can be seen that the circuit breaker is connected directly to the battery source of power 62.

The mobile unit also includes its own central processing unit 226 which, in effect, is somewhat of a slave to the central processing unit 200. The central processing unit 226, as well as the central processing unit 200 both operate as control units and as motor drivers, as well. In this respect, the central processing unit 226 controls the operation of the drive motors 60 in response to inputs from the bumper switch contacts 164, as shown in FIG. 15 of the drawings.

The mobile unit has a connector board 230 which connects to a similar connector board 232 on the cabinet 20, when the mobile unit reaches a home or nested position within the cabinet 20, also as shown in both FIGS. 14 and 16 of the drawings.

The timing for operation of the various components is more fully set forth in FIGS. 16–20 of the drawings. FIGS. 16 and 17 specifically illustrate the operation of causing the mobile unit to move in different directions in response to contacting of an obstruction. In this respect, the central processing unit 226 of the mobile unit 22 includes a plurality of timing circuits which control the driving of the motor 60 either in a forward or a rearward direction or in a stall. Thus, if the left bumper contacts an obstruction, it will cause an activation of the right drive motor 60, a timer and a backup timer in the central processing unit. The backup timer will thereupon reverse both drive wheels 58 for two time periods and will then return to forward rotation, as shown in FIG. 16. The left wheel drive motor 60 will be activated by the backup timer and reverse in direction for one time period, as shown in FIG. 16. As a result, the mobile unit detects the obstacle, backs up and then turns away from the obstacle.

The timing circuit of FIG. 17 shows a similar operation if the right bumper detects that obstacle. In this case, the timing arrangements are set forth for back up of the mobile unit and turning away from the obstacle. In the diagrams as shown in FIGS. 16 and 17, the time periods are approximately each one second. The back up times in actual operation, are shortened to approximately one-half second every ninth time. This will increase the turning times which eliminates repeating patterns and assists the mobile unit in maneuvering out of a tight position when contacting a plurality of obstructions.

FIG. 18 shows the timing arrangement when both bumpers detect obstacles at essentially the same point in time. Here again, the timing diagrams are self explanatory and show how the mobile unit backs up and moves away from the obstruction.

FIG. 19 illustrates the timing arrangement when the mobile unit detects an obstacle for an extended period of time, as for example, if the mobile unit were in a tightly confined area with a plurality of obstructions. Thus, if, for example, the left bumper detects an obstacle, the right bumper remains neutral. The back up timer will reverse both wheels for one time period and thereafter resets. The right drive motor 60 will reverse the right drive wheel for the same extended duration as the bumper detects the obstacle. In this case, it can be seen, for example, that the right timer will remain activated and cause right drive wheel to reverse operation for four time periods. The left drive wheel will reverse for one direction when activated by the left drive wheel back up timer. As a result, the mobile unit will back up then keep turning away from the obstacle until it is completely clear of the obstacle.

FIG. 20 more fully illustrates the operations of the components in the main cabinet 20. In this case, the main duty switch will control the operation of the control cabinet by a manual operation. A timer, such as the timer 52, will control the desired cleaning time for each cleaning operation. In like manner, the door motor 47 is similarly controlled by a timer which may be included within the main processing unit 200. It can be observed that the infrared homing beacon will be energized to cause a homing operation of the mobile unit. If the mobile unit is in a cleaning operation, upon detecting the homing beacon, the mobile unit will immediately head to a homing position. As it reaches the home position, it will automatically connect with the recharger 208. Moreover, the automatic debris collection station 26 will be operated and the hose 114 will be lowered to ultimately connect to the mobile unit. The vacuum will then be turned on in the debris collection station 24 in order to clean the contents of the temporary storage compartment.

The carpet cleaning system C of the present invention is highly effective to maintain and to clean carpeted areas on a periodic basis, almost completely without any manual intervention or supervision for extended periods of time. The carpet cleaning system of the invention needs only the stationary cabinet and the roving, or moving automated vacuum cleaner mobile unit for cleaning relatively flat carpeted areas. Moreover, the stationary debris collection station 26 removes all of the dust and debris which has been picked-up by the mobile unit. Furthermore, a means is provided for recharging the battery source of power 62 which operates the various drive motors in the mobile unit.

The user of the present invention can set vacuum operation start times and end times using the timer 52 mounted within the cabinet 20. When a vacuum start time is obtained, the mobile unit is fully charged with electrical power and cleaned so that debris may be collected in the storage compartment of the debris collection station 26. The mobile unit 22 will immediately become energized and under its own power will immediately detach the charge connector plug 64 from the charge receptacle 70. This will enable the mobile unit to immediately move out under its own power rearwardly from the cabinet onto the carpeted area to be cleaned. At that point, the drive motors for the wheels will reverse direction and enable the mobile unit to be moved over the carpeted area and only guided by its on-board circuitry.

The mobile unit with move in a generally straight path until it contacts an obstruction or an obstacle with its rather sensitive obstruction detection system. At that point, the mobile unit will reverse direction and turn to either the right or left, according to its orientation set forth in the truth tables of FIGS. 13A and 13B. This creates a rather surprisingly thorough criss-cross pattern which essentially covers the entire carpeted area to be cleaned, much in the same manner as a conventional swimming pool cleaner will traverse a swimming pool in a random path and still clean the entire swimming pool surface area.

The mobile unit 22 also detects the obstructions, as indicated, and moves in a direction to avoid those obstructions. In addition, the mobile unit will detect the presence of a drop-off, such as stairs, or for that matter an uncarpeted area, by sensing irregularities in carpet height. At that point, the mobile unit will again turn its direction and move in a different path.

When the pre-established time period for conducting a vacuum cleaning operation ends, the infrared homing beacon 44 will be energized in the cabinet 20 emitting an essentially invisible infrared light beam across the carpeted area. The mobile unit will almost inevitably be contacted by that infrared homing beam when energized. Even if it does not immediately see the infrared homing beam, it will continue to move in its random path until such time as it does detect the infrared homecoming beam. At that point, the drive motors 60 will be properly energized to drive the mobile unit toward the cabinet 20.

When the mobile unit arrives at the cabinet, its recharging plug 64 will immediately be guided into and extend into the recharging receptacle 70. Moreover, all of the motors in the mobile unit will then be automatically de-energized while the battery 62 is being recharged. Furthermore, in approximately one second after return to its home position, and connection to the recharging system, the mechanical hose assembly, previously described comprising the flexible hose 144 will be lowered and connected to the mobile unit at which point the stationary vacuum cleaner motor 210 in the station 26 is energized. This will, in turn, clean out the debris and dust collected in the temporary storage compartment 90 of the mobile unit. After a predetermined time period, typically about thirty seconds, the stationary vacuum motor in the station 26 will become de-energized and the entire hose assembly will retract to its upper position. This will, in turn, leave the mobile unit 22 clear of any obstructions and free to recharge within the cabinet until it is again energized at the next vacuum start period.

It is also possible to operate the cleaning system of the present invention using a hand-held remote control unit. A conventional television or a VCR remote control unit has literally been found to be effective for this purpose. Thus, one could initiate a start and end of a cleaning cycle with a remote control system. In like manner, it is Possible to control the actual guiding of the mobile unit during driving activities by using certain buttons or control elements which would cause a left or right drive movement. As an example, the number "2" push button switch could be used to control left-hand movement and the number "3" push button switch could be used to control right-hand drive movement. Further, if desired, a specially designed hand-held remote control unit could be provided with the cleaning system of the present invention.

The cleaning system of the present invention allows numerous advantages over conventional vacuum cleaners, as well as other automated cleaning systems. The use of the debris collection and storage mechanism allows the mobile unit to be cleaned after each carpet cleaning operation thereby reducing the size of the temporary storage area. Not only does this decrease the overall size of the mobile unit, but it concomitantly increases the maneuverability and the ability of the mobile unit to move under and behind a much greater number of obstacles. The small size of the mobile unit also is less intrusive, thereby adding to its appeal.

The programmable timer 52 with the cleaning system allows the user to set a permanent vacuum schedule, including the start time and end time. This will allow the mobile unit to vacuum a selected area of an environment, even in the absence of the user.

This system provides a unique advantage in that it permits cleaning of a selected carpeted area in a commercial establishment after closing hours. Moreover, and for a dwelling environment, it allows the occupants of the dwelling to permit a cleaning operation to be conducted in their absence, thereby freeing them of the necessity to engage in a laborious periodic carpet cleaning operation. Further, the carpet cleaning system of the present invention is particularly effective for the elderly and disabled who do not have the necessary ability or strength to engage in continuous carpet cleaning operations.

The automatic homing system and the recharging system previously described allows the mobile unit the advantage of returning to its home position and to be recharged completely on its own operation without any manual intervention. Further, even the cleaning of the temporary storage area in the mobile unit allows cleaning without any manual intervention. It is only necessary for the user to periodically clean the debris collection station 26 in the main housing 20.

Thus, there has been illustrated and described, a unique and novel carpet cleaning system which utilizes a stationary housing and a mobile carpet cleaning unit which requires no manual control of the same during operation thereof. The present invention also provides a unique method of cleaning carpeted areas without manual intervention. The present invention thereby fulfills all of the objects and advantages which have been sought. It should be understood that many changes, modifications, variations and other uses and applications will become apparent to those skilled in the art after considering this specification and the accompanying drawings. Therefore, any and all such changes, modifications, variations and other uses and applications which do not depart from the spirit and scope of the invention are deemed to be covered by the invention.

Having thus described the invention, what I desire to claim and secure by Letters Patent is:

1. An automatically operable vacuum cleaning apparatus capable of movement in a specified area, said cleaning apparatus comprising:
    a) a mobile cleaning apparatus having a body which is powered for driving movement in the specified area and in a non-controlled randomly operated path;
    b) drive means in said body for generating a powered movement and driving the mobile cleaning apparatus in the specified area;
    c) sensor means associated with said body which is actuated when the sensor means detects a fixed obstruction; and
    d) control means operatively connected to said sensor means and said drive means to control the drive means for altering the driving movement of the apparatus in another non-controlled randomly generated path which is different from the path followed by the apparatus when first sensing the fixed obstruction and where the apparatus will automatically assume different random paths until the sensor means no longer senses the fixed obstruction thereby allowing the apparatus to adopt a path which does avoid the obstruction allowing the apparatus to thereby move beyond the fixed obstruction.

2. The automatically operable vacuum cleaning apparatus of claim 1 further characterized in that said sensor means comprises a plurality of spaced apart sensors which are separately actuated when the sensor detects a fixed obstruction in the region of the sensor, and that the sensor which is actuated will cause a drive movement different than if another sensor is actuated.

3. The automatically operable vacuum cleaning apparatus of claim 1 further characterized in that said sensor means comprises a shiftable bumper on said body and which will actuate a contact switch associated with that bumper when the bumper contacts a fixed obstruction.

4. The automatically operable vacuum cleaning apparatus of claim 1 further characterized in that said drive means comprises wheels mounted on said body and a bi-directional drive motor mounted in the body and which is connected to said wheels on the body for positively driving same in a forward and rearward direction.

5. The automatically operable vacuum cleaning apparatus of claim 4 further characterized in that the apparatus comprises a drop-off detector for detecting the presence of a drop-off and operates in conjunction with the control means to cause the apparatus to change to a direction which will avoid the drop-off.

6. The automatically operable vacuum cleaning apparatus of claim 1 further characterized in that the drive means comprises a pair of drive wheels which are mounted on said body and a separate bi-directional drive motor connected to and driving each of said drive wheels.

7. An automatically operable vacuum cleaning apparatus capable of movement in a specified area and which is capable of avoiding driving into and over a drop-off, said apparatus comprising:

a) a mobile cleaning apparatus having a body which is powered for driving movement in the specified area;

b) drive means in said body for generating a powered movement and driving the mobile cleaning apparatus in the specified area;

c) a sensor capable of sensing a floor surface and being associated with a floor surface detector comprising an arm and a generally U-shaped lower end presenting an arcuate surface for riding on a floor surface or being spaced from a floor surface in very close proximity thereto, and being adapted for shifting movement in response to variations in said floor surface; and d) a driving control means for causing said drive means to move the mobile unit away from a drop-off in the floor surface as sensed by said sensor upon actuation of said control means in response to a drop-off signal from said sensor.

8. The automatically operable vacuum cleaning apparatus of claim 7 further characterized in that said U-shaped arcuate surface is capable of riding on or being spaced from a floor surface in very close proximity thereto and which is shiftable in response to variations in a floor surface which exceed a predetermined amount.

9. An automatically operable vacuum cleaning apparatus capable of movement in a specified area, said cleaning apparatus comprising:

a) a mobile cleaning apparatus having a body which is powered for driving movement in the specified area and in a non-controlled randomly operated path;

b) drive means in said body for generating a powered movement and driving the mobile cleaning apparatus in the specified area;

c) sensor means associated with said body which is actuated when the sensor means senses a fixed obstruction;

d) control means operatively connected to said sensor means and said drive means to cause said drive means to alter the driving movement of the apparatus in another non-controlled randomly generated path which is different from the path followed by the apparatus when first sensing the fixed obstruction until the sensor means no longer senses the fixed obstruction thereby allowing the apparatus to move in a path beyond the fixed obstruction; and e) drop-off detection means for detecting the presence of a drop-off and causing the apparatus to randomly alter its direction until it avoids the drop-off and thereby allowing the apparatus to travel in a path away from the drop-off.

10. The automatically operable vacuum cleaning apparatus of claim 1 further characterized in that said sensor means comprises a plurality of spaced apart contacts which are separately actuated when the body contacts a fixed obstruction in the region of the contact, and that the contact which is actuated will cause a drive movement different than if another contact is actuated.

11. The automatically operable vacuum cleaning apparatus of claim 7 further characterized in that said drop-off detection means comprises a shiftable arm on said body and which will drop and thereby cause initiation of a drop-off signal when the apparatus approaches a drop-off causing the apparatus to move away from the drop-off.

12. The automatically operable vacuum cleaning apparatus of claim 1 further characterized in that the drive means comprises a pair of wheels mounted on said body and a pair of bi-directional drive motors mounted in the body and which is connected said to wheels on the body for positively driving same and where the drive means will selectively cause operation of the drive motors to move the apparatus away from a drop-off.

13. The automatically operable vacuum cleaning apparatus of claim 1 further characterized in that the drive means comprises wheels mounted on the said body and a bi-directional drive motor mounted in the body and which is connected to said wheels on the body for causing a driving force to be applied to the wheels to allow the wheels to be driven in a plurality of different directions.

14. The automatically operable vacuum cleaning apparatus of claim 13 further characterized in that the apparatus comprises a drop-off detector for detecting the presence of a drop-off and operates in conjunction with the control means to cause the apparatus to change to a direction which will avoid the drop-off.

15. The automatically operable vacuum cleaning apparatus of claim 14 further characterized in that said wheels comprise a pair of drive wheels which are mounted on said body and a pair of separate bi-directional drive motors are mounted in said body with each one of said motors connected to a separate one of said drive wheels.

\* \* \* \* \*